US010300651B2

United States Patent
Noorazar et al.

(10) Patent No.: US 10,300,651 B2
(45) Date of Patent: May 28, 2019

(54) PORTABLE 3D PRINTER

(71) Applicant: INNOSUN LLC, San Diego, CA (US)

(72) Inventors: Sina Noorazar, San Diego, CA (US); Aria Noorazar, San Diego, CA (US)

(73) Assignee: INNOSUN LLC, San Diego, CA (US)

( * ) Notice: Subject to any disclaimer, the term of this patent is extended or adjusted under 35 U.S.C. 154(b) by 0 days.

(21) Appl. No.: 15/951,031

(22) Filed: Apr. 11, 2018

(65) Prior Publication Data

US 2018/0290365 A1 Oct. 11, 2018

Related U.S. Application Data

(60) Provisional application No. 62/484,271, filed on Apr. 11, 2017, provisional application No. 62/560,105, (Continued)

(51) Int. Cl.
*B29C 64/118* (2017.01)
*B29C 64/209* (2017.01)
(Continued)

(52) U.S. Cl.
CPC ............ *B29C 48/90* (2019.02); *B29C 64/118* (2017.08); *B29C 64/209* (2017.08);
(Continued)

(58) Field of Classification Search
CPC ... B29C 64/118; B29C 64/209; B29C 64/227; B29C 64/232; B29C 64/236;
(Continued)

(56) References Cited

U.S. PATENT DOCUMENTS

| 4,319,794 A | 3/1982 | Bachor |
| D298,943 S | 12/1988 | Haager et al. |

(Continued)

FOREIGN PATENT DOCUMENTS

CN 204322532 5/2015

OTHER PUBLICATIONS

International Search Report and Written Opinion for International Application No. PCT/US2018/027171, dated Aug. 21, 2018 (11 pages).

*Primary Examiner* — Joseph S Del Sole
*Assistant Examiner* — Joseph S Leyson
(74) *Attorney, Agent, or Firm* — Perkins Coie LLP

(57) ABSTRACT

Techniques, systems, and devices are described for implementing a portable and affordable 3D printer. One portable 3D printer includes a material supply system to supply printing material to a print engine. The print engine includes an extrusion system that comprises a heating block, which includes a top portion coupled to the material supply system to receive the printing material, a heating body to heat up the printing material, and a heat break portion positioned between the top portion and the heating body. The printer further includes a movement system to allow a horizontal movement of the extruder carriage, a build platform positioned below the movement system to receive the printing material from the extrusion system, and a printer body positioned to enclose the extrusion system, the movement system, and the build platform.

30 Claims, 28 Drawing Sheets

Related U.S. Application Data filed on Sep. 18, 2017, provisional application No. 62/589,349, filed on Nov. 21, 2017.

(51) Int. Cl.

| | | |
|---|---|---|
| *B29C 64/227* | (2017.01) | |
| *B29C 64/25* | (2017.01) | |
| *B29C 64/245* | (2017.01) | |
| *B29C 64/295* | (2017.01) | |
| *B29C 48/90* | (2019.01) | |
| *B29C 64/236* | (2017.01) | |
| *B29C 64/364* | (2017.01) | |
| *B29C 64/30* | (2017.01) | |
| *B29C 64/232* | (2017.01) | |
| *B33Y 40/00* | (2015.01) | |
| *B33Y 30/00* | (2015.01) | |
| *B33Y 10/00* | (2015.01) | |

(52) U.S. Cl.
CPC .......... *B29C 64/227* (2017.08); *B29C 64/232* (2017.08); *B29C 64/236* (2017.08); *B29C 64/25* (2017.08); *B29C 64/30* (2017.08); *B29C 64/364* (2017.08); *B29C 64/245* (2017.08); *B29C 64/295* (2017.08); *B29C 2948/92428* (2019.02); *B33Y 10/00* (2014.12); *B33Y 30/00* (2014.12); *B33Y 40/00* (2014.12)

(58) Field of Classification Search
CPC ..... B29C 64/245; B29C 64/25; B29C 64/295; B29C 64/30; B29C 64/364; B33Y 10/00; B33Y 30/00; B33Y 40/00
See application file for complete search history.

(56) References Cited

U.S. PATENT DOCUMENTS

| | | | |
|---|---|---|---|
| D311,177 S | 10/1990 | Peters | |
| D341,827 S | 11/1993 | Lai et al. | |
| 5,939,008 A * | 8/1999 | Comb | B33Y 10/00 |
| | | | 264/308 |
| D432,160 S | 10/2000 | Kabumoto et al. | |
| D458,911 S | 6/2002 | Kataoka | |
| D461,187 S | 8/2002 | Andre et al. | |
| D506,465 S | 6/2005 | Geeng | |
| D508,491 S | 8/2005 | Choi | |
| D514,556 S | 2/2006 | Rising | |
| D523,897 S | 6/2006 | Iue | |
| D526,640 S | 8/2006 | Chin et al. | |
| 7,204,684 B2 | 4/2007 | Ederer et al. | |
| 7,297,304 B2 | 11/2007 | Swanson et al. | |
| D577,743 S | 9/2008 | Liu | |
| D580,952 S | 11/2008 | Liu | |
| D598,906 S | 8/2009 | Chiba et al. | |
| D602,019 S | 10/2009 | Wang et al. | |
| D623,136 S | 9/2010 | Andre et al. | |
| D629,827 S | 12/2010 | Morenstein et al. | |
| 7,938,356 B2 * | 5/2011 | Taatjes | B65H 75/28 |
| | | | 242/125.3 |
| D646,148 S | 10/2011 | Good et al. | |
| D648,186 S | 11/2011 | Pourian et al. | |
| D649,148 S | 11/2011 | Gengoux | |
| 8,318,076 B2 | 11/2012 | Wang et al. | |
| D677,723 S | 3/2013 | Buel et al. | |
| D681,548 S | 5/2013 | Zhang et al. | |
| D690,280 S | 9/2013 | Schul | |
| D698,869 S | 2/2014 | Strzelewicz et al. | |
| D711,463 S | 8/2014 | Costabeber | |
| D722,053 S | 2/2015 | Wang | |
| D729,309 S | 5/2015 | Jun et al. | |
| D732,587 S | 6/2015 | Hsu et al. | |
| D732,588 S | 6/2015 | Lin et al. | |
| D733,196 S | 6/2015 | Wolf et al. | |
| D734,814 S | 7/2015 | Yeh et al. | |
| D735,267 S | 7/2015 | Chung et al. | |
| D736,838 S | 8/2015 | Costabeber | |
| D739,885 S | 9/2015 | Lee et al. | |
| D740,863 S | 10/2015 | Kemperle et al. | |
| D742,439 S | 11/2015 | Kraibuhler et al. | |
| D745,903 S | 12/2015 | Armani | |
| D749,153 S | 2/2016 | Anantha et al. | |
| D752,661 S | 3/2016 | Anantha et al. | |
| D757,132 S | 5/2016 | Liu et al. | |
| D760,825 S | 7/2016 | Solorzano et al. | |
| D763,330 S | 8/2016 | Olive et al. | |
| D770,545 S | 11/2016 | Olive et al. | |
| D771,164 S | 11/2016 | Noorazar | |
| D777,808 S | 1/2017 | Chang et al. | |
| D787,574 S | 5/2017 | Lee et al. | |
| D826,296 S | 8/2018 | Noorazar et al. | |
| 2004/0104515 A1* | 6/2004 | Swanson | B29C 41/36 |
| | | | 264/497 |
| 2013/0327917 A1* | 12/2013 | Steiner | F16M 11/12 |
| | | | 248/649 |
| 2014/0043630 A1 | 2/2014 | Buser et al. | |
| 2015/0108687 A1* | 4/2015 | Snyder | B29C 64/386 |
| | | | 264/308 |
| 2015/0140150 A1 | 5/2015 | Schmehl et al. | |
| 2015/0165687 A1 | 6/2015 | Ho et al. | |
| 2015/0290861 A1* | 10/2015 | Douglass | B29C 47/66 |
| | | | 264/255 |
| 2016/0031159 A1* | 2/2016 | Church | B33Y 30/00 |
| | | | 264/308 |
| 2016/0193778 A1 | 7/2016 | Lee et al. | |
| 2016/0236407 A1 | 8/2016 | Armani et al. | |

* cited by examiner

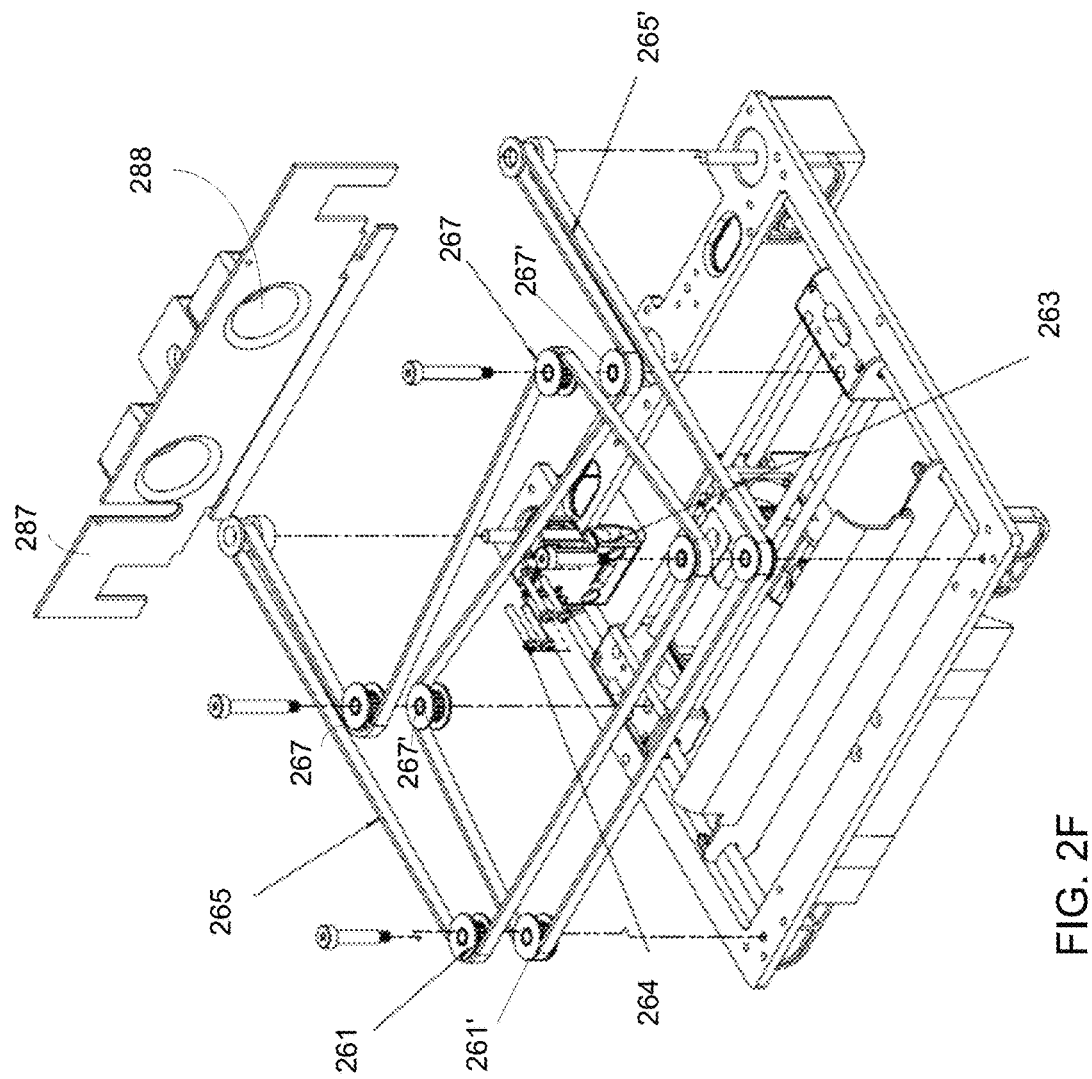

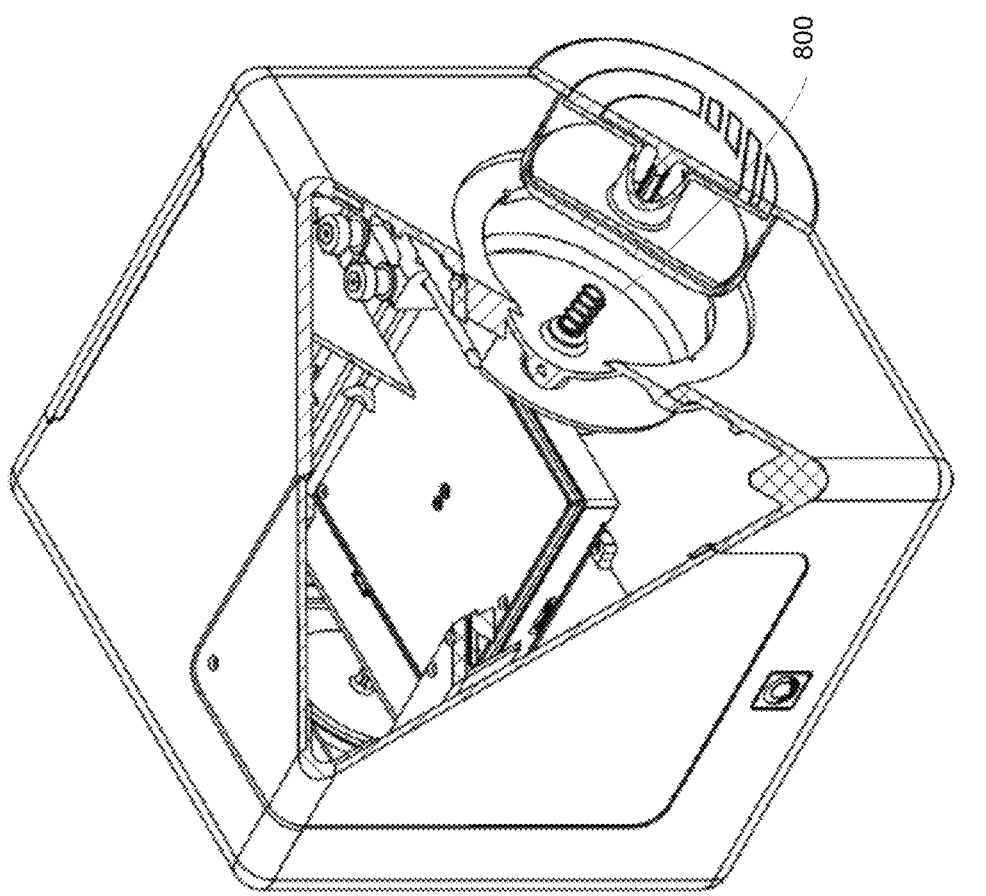

PORTABLE 3D PRINTER

CROSS REFERENCE TO RELATED APPLICATIONS

This patent document claims the benefit of priority of U.S. Provisional Patent Application No. 62/484,271, filed Apr. 11, 2017, entitled "PORTABLE 3D PRINTER"; U.S. Provisional Patent Application No. 62/560,105, filed Sep. 18, 2017, entitled "PORTABLE 3D PRINTER"; and U.S. Provisional Patent Application No. 62/589,349, filed Nov. 21, 2017, entitled "PORTABLE 3D PRINTER WITH IMPROVED MOVEMENT SYSTEM". The entire content of the before-mentioned patent applications is incorporated by reference as part of the disclosure of this application.

TECHNICAL FIELD

This present disclosure is directed generally to three-dimensional (3D) printing, and more specifically, to systems, devices, and techniques to achieve a 3D printer having a small form factor.

BACKGROUND 3D printing, also known as additive manufacture, has an ever increasing presence in manufacturing. Agile tooling using 3D printing is a cost effective and high quality method to quickly respond to customer and market needs. However, traditional 3D printers are typically bulky and expensive. Many of them occupy a large amount of space, and are priced from at least $2,000. Accordingly, there remains a need for improved techniques and system for providing a portable and affordable 3D printer that can be used in homes, offices, or classrooms.

SUMMARY

In this document, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Techniques, systems, and devices are disclosed for implementing a portable and affordable 3D printer.

In one exemplary aspect, a portable three-dimensional (3D) printer is disclosed. The printer includes a material supply system including a spool or a cartridge to supply printing material to a print engine of the 3D printer. The print engine including an extrusion system that comprises a heating block. The heating block includes a top portion coupled to the material supply system to receive the printing material, a heating body positioned below the top portion, and a heat break portion positioned between the top portion and the heating body. The heating body is coupled to a heating element operable to supply heat to the heating body and heat up the printing material, the heating body further coupled to a temperature sensor operable to sense a temperature of the heating body. The heat break portion includes a first end in contact with the top portion, a second end in contact with the heating body, and a center. Each end has a larger cross-sectional area than a cross-sectional area of the center to reduce heat transfer from the heating body to other components of the 3D printer. The portable 3D printer includes a movement system that comprises an extruder carriage positioned to carry the extrusion system, multiple pulleys, and one or more belts in contact with each of the multiple pulleys and with the extruder carriage to allow a horizontal movement of the extruder carriage. Each pulley is positioned to rotate around a vertical axis, and at least two of the multiple pulleys are stacked on top of one another to allow a compact design of the movement system. The portable 3D printer includes a build platform positioned below the movement system to receive the printing material from the extrusion system; and a printer body that encloses the extrusion system, the movement system, and the build platform. The printer body includes an aperture to allow access to an internal space of the 3D printer.

In another exemplary aspect, a portable 3D printer is disclosed. The portable 3D printer includes a material supply system including a spool or a cartridge to supply printing material to a print engine. The print engine includes an extrusion system positioned to receive the printing material from the material supply system. The portable 3D printer includes a movement system that comprises one or more belts, multiple pulleys in contact with the one or more belts, and an extruder carriage in contact with the one or more belts. Each pulley is positioned to rotate around a vertical axis, and at least two of the multiple pulleys are stacked on top of one another to allow a compact design of the movement system. The extruder carriage is positioned to carry the extrusion system and comprises an upper portion in contact with the one or more belts to allow a horizontal movement of the extruder carriage and a lower portion coupled to the extrusion system. The upper portion includes a first wall generally parallel to the one or more belts, a second wall generally parallel to the first wall, a center portion located between the first wall and the second wall and spaced apart from the first wall and the second wall, and one or more coupling means that can adjustably pass through at least a section of the extruder carriage to make contact with a section of the one or more belts and to allow a tension adjustment of the one or more belts. The portable 3D printer includes a build platform positioned below the movement system to receive the printing material from the extrusion system, and a printer body positioned to enclose the extrusion system, the movement system, and the build platform. The printer body includes a movable door to allow access to the build platform.

In yet another exemplary aspect, a portable 3D printer includes a material supply system including a spool or a cartridge to supply printing material to a print engine. The print engine including an extrusion system positioned to receive the printing material from the material supply system. The portable 3D printer includes a movement system that comprises an extruder carriage positioned to carry the extrusion system, multiple pulleys, and one or more belts in contact with each of the multiple pulleys and with the extruder carriage to allow a horizontal movement of the extruder carriage. Each pulley is positioned to rotate around a vertical axis, and at least two of the multiple pulleys are stacked on top of one another to allow a compact design of the movement system. The portable 3D printer includes a build platform positioned below the movement system to receive the printing material from the extrusion system. The build platform comprises a build plate that includes a bottom layer including a heating element operable to heat up the build plate, a middle layer positioned on the bottom layer to provide structural support for the build plate, and a top layer configured to provide a smooth printing surface. The build platform includes a leveling adapter positioned under the build plate, the leveling adapter including multiple leveling points located in proximity to corners of the leveling adapter, and multiple leveling knobs coupled to the multiple leveling points of the leveling adapter to allow the build plate to be leveled through the leveling adapter. The portable 3D printer includes a printer body that encloses the extrusion system, the movement system, and the build platform. The printer body includes an aperture to allow access to an internal space of the 3D printer.

The above and other aspects and their implementations are described in greater detail in the drawings, the description and the claims.

BRIEF DESCRIPTION OF THE DRAWINGS

FIG. 2F shows yet another exemplary embodiment of the movement system in accordance with one or more embodiments of the present technology.

FIG. 2I shows an exemplary zoom-in view of the movement system shown in FIG. 2H.

FIG. 8A shows an isometric view of an exemplary cartridge ejection system that is positioned at one side of the printer body in accordance with one or more embodiments of the present technology.

DETAILED DESCRIPTION

This document describes techniques, devices, and systems for providing a portable and affordable 3D printing solution that can be used in homes, offices, and classrooms. In some embodiments, the desktop 3D printer is sometimes referred to as "Cubibot" or "Cubibot printer," which represents one example implementation of a fused filament fabrication (FFF) heat extrusion-based desktop 3D Printer that has been designed to reduce the cost of production, assembly and manufacturing of the printer while offering new functionalities, as well as features of larger and more expensive 3D Printers. In one exemplary embodiment, Cubibot has been optimized to have dimensions of about only 10 inches on each side (a volume of approximately 1000 cubic inches) while being capable of printing objects with cross sectional areas as large as 5 inches by 5 inches. Cubibot is also capable of printing different materials such as flexible, ABS, Nylon, PLA, wood PLA and more.

The disclosed features of the printer also improve the ease of use of the printer compared to existing consumer and industrial 3D Printers. Some of the features of the disclosed printers include a body that is simply three parts (top, center and bottom), as well as a movement system that is a formed as a separate component to facilitate assembly and to provide additional advantages and benefits as described below. Additional features include a filtered ventilation system which allows the printer to be safely operated at home or other indoor spaces, a specially-designed filament cartridge ejection system and more features as explained below.

Figure 1:
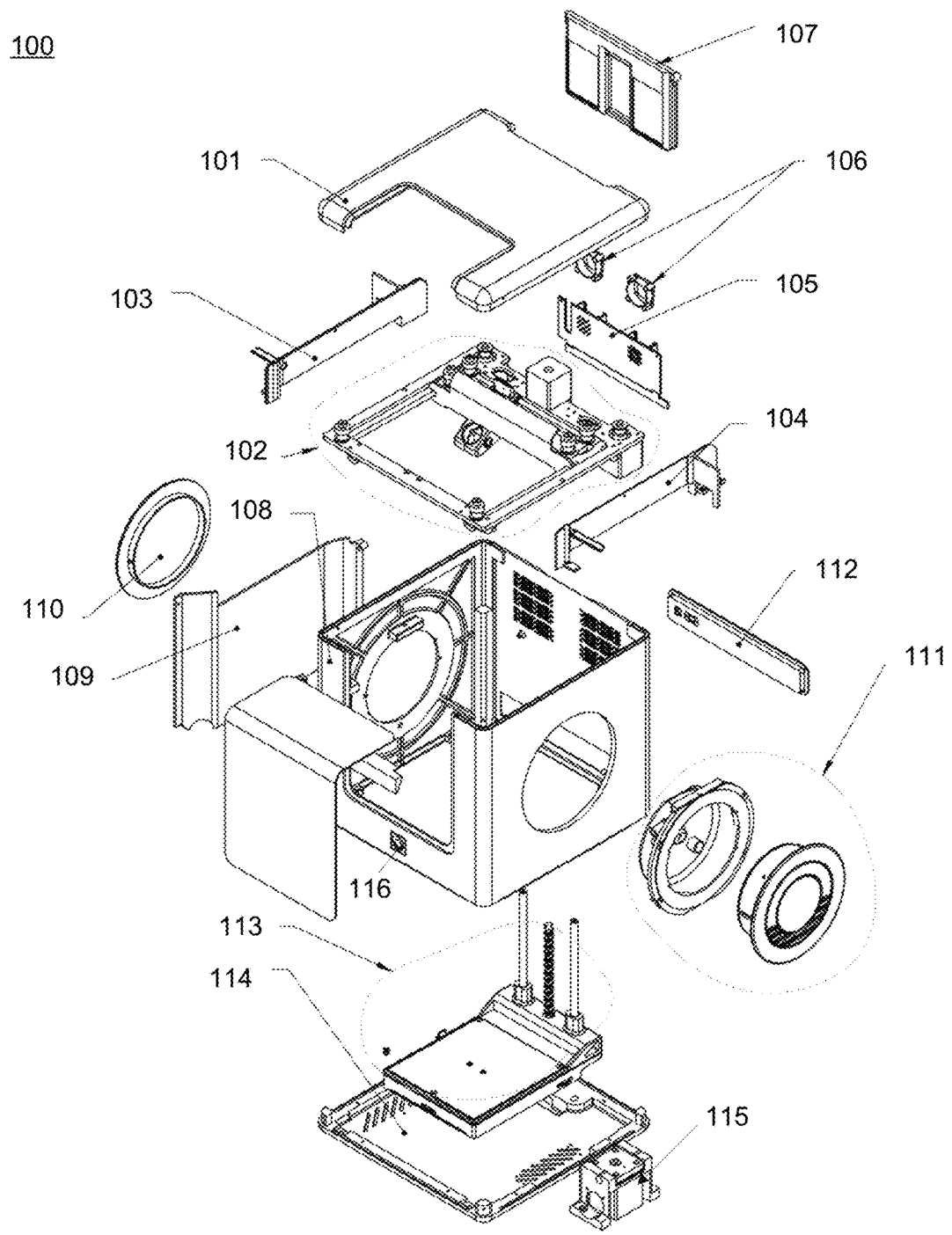
FIG. 1 shows an overview diagram of an exemplary 3D printer in accordance with one or more embodiments of the present technology.

FIG. 1 shows an overview diagram of an exemplary 3D printer in accordance with one or more embodiments of the present technology. The printer 100 includes various additional components but only some of those are shown in FIG. 1 to avoid clutter. The printer 100 includes a top cover 101, a movement system 102, a back support frame 105, two exhaust fans 106, and filter casing 107, a body casing 108, a side cover 109, a cover 110, a cartridge ejection system 111, a back panel 112, a heated build platform 113, and a bottom cover for the body 114. In some embodiments, the printer 100 also includes two side support frames 103 and 104. An electronic control board (not shown) can be positioned between the cover 110 and side cover 109. Such a placement allows easy access to the electronic board by removing the cover 110. The electronic control board can include a processor (e.g., a microprocessor, a digital signal processor (DSP), an ASIC, an FPGA and the like) and a memory that is coupled to the processor. The memory can include processor executable codes, which upon execution by the processor, can perform various operations, including but not limited to, providing data and commands to other components, communicating (e.g., via a wireless transmission protocol) with other components of the device or with outside entities, databases and devices. In particular, the electronic control board can provide various electrical controls, data communications and provide control over other functionalities of the 3D printer. One or more lights 116 (e.g., an RGB LED) are placed on the front panel and are coupled to the electronic control board. The lights 116 can be used to communicate a variety of status and error conditions to the user (and/or a repair person). The information conveyed through the lights 116 can be as simple as on/off or color functionality (e.g., off=red light; on=green light), or can be based on a color, duration or number of blinking lights.

Some of the key components are discussed in further detail in connection with FIGS. 2A-11. In particular, the printer includes a single plate for its movement system, a compact heating block in its extrusion system, and a filtered ventilation system to allow safer use in indoor environments such as homes, offices, and classrooms.

Movement System

Figure 2A:
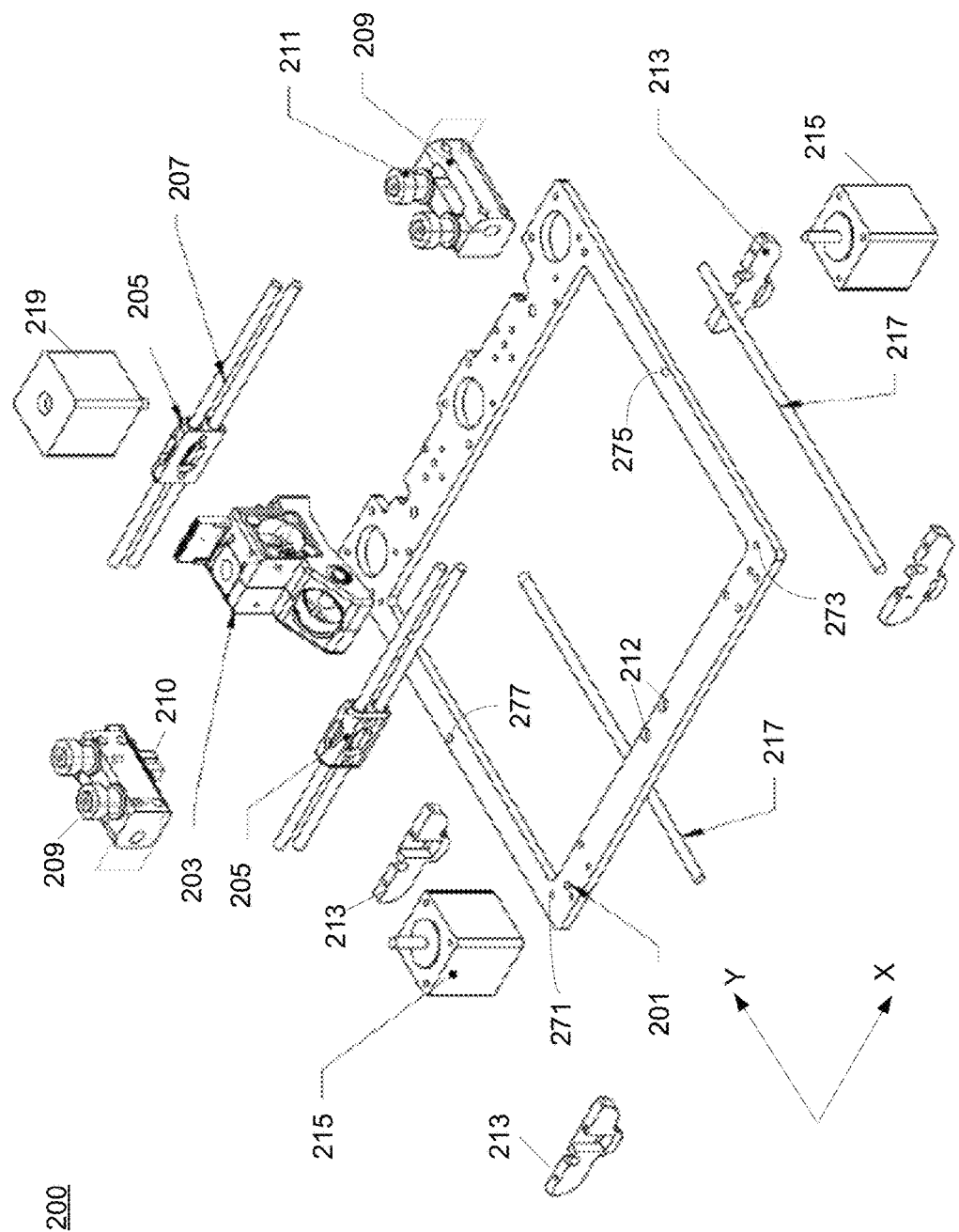
FIG. 2A illustrates an exploded view of an exemplary movement system of a portable 3D printer in accordance with one or more embodiments of the present technology.

FIG. 2A illustrates an exploded view of an exemplary movement system 200 of a portable 3D printer in accordance with one or more embodiments of the present technology. The movement system 200 includes a single base plate 201 (e.g., an aluminum base plate) that acts as a support for precise movement of an extrusion system 203 along X and Y directions.

To facilitate the movement of the extrusion system 203 along the X axis, the system 200 includes two carriers 205 coupled to the extrusion system 203 and four linear rods 207 going through the carriers along X axis. The system also includes two carriage blocks 209 that carry one or more pulleys 211 for belt tensioning and movement. These components enable movement of the extrusion system 203 in both positive and negative X directions. In some embodiments, each carriage block 209 includes an X stop 210 positioned to stop the movement of the extrusion system 203 in X directions.

The system includes two linear rods 217 to enable movement of the extrusion system 203 long the Y-axis. Four rod stoppers 213 are used to hold the two linear rods 217 and to stop the extrusion system's movement along the Y-axis when the extrusion system 203 reaches the boundary of the printing area. An additional Y-stop (not shown) can be installed via the two holes 212 located at the front side of the base plate 201 to stop the extrusion system from further movement along Y axis.

To drive the X and Y movement of the extrusion system 203, the movement system 200 includes two stepper motors 215. In some embodiments, a third motor 219 is coupled to the back section of the base plate 201 to drive movement of the plate long the Z direction.

Figure 2B:
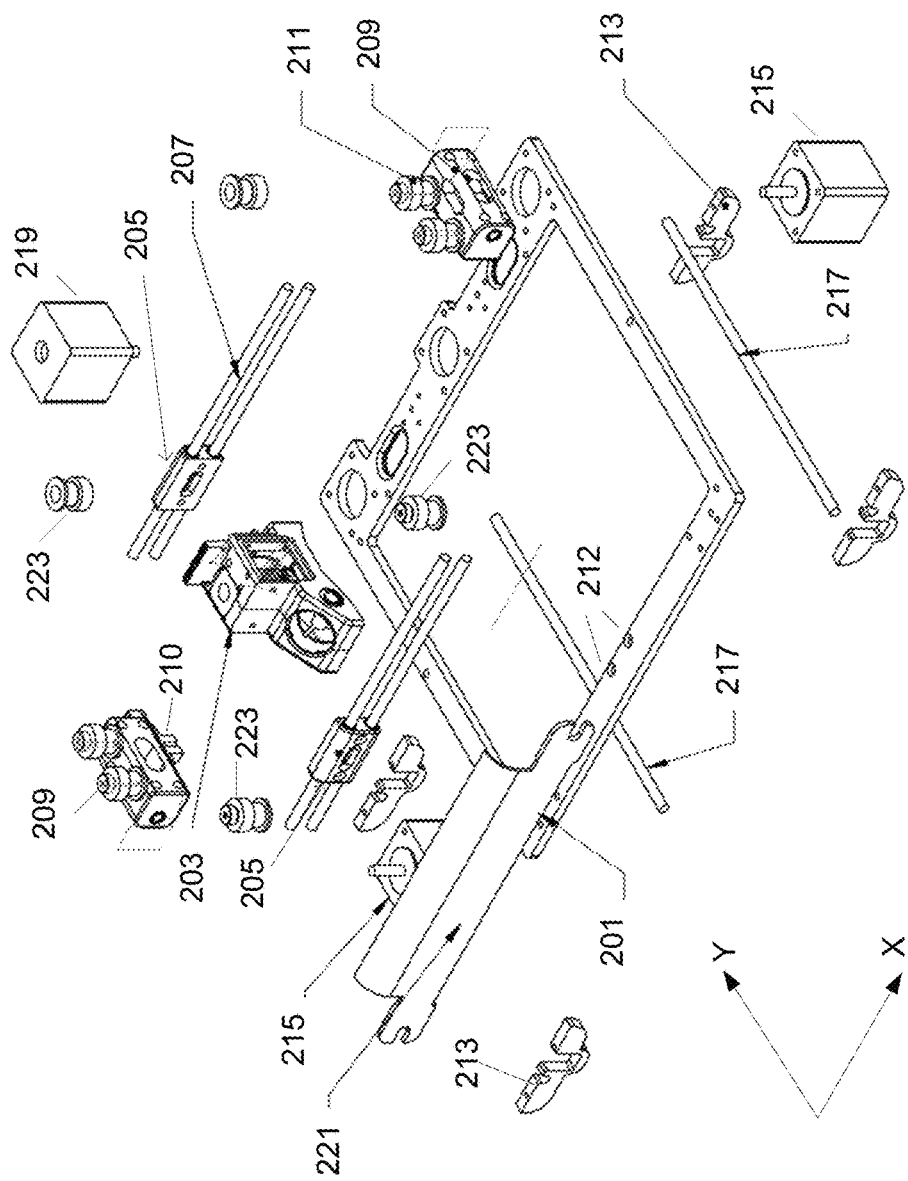
FIG. 2B illustrates an exploded view of another exemplary movement system of a portable 3D printer in accordance with one or more embodiments of the present technology.

FIG. 2B illustrates an exploded view of another exemplary movement system of a portable 3D printer in accordance with one or more embodiments of the present technology. The main components included in this specific embodiment are similar to the embodiment shown in FIG. 2A. However, the specific embodiment of FIG. 2B also includes a front barrier or cover 221 and additional pulleys 223 to facilitate the movement of the extrusion system 203. The front cover 221 operates to provide safety and security features by providing a barrier that shields the interior of the 3D printer from contaminants from the outside environment (e.g., accidental dropping of items into the printer), and it also keeps the hot components away from the reach of a user.

All components of the movement system 200 can be manufactured as sub-assemblies and attached to the single base plate 201. In one embodiment, only four screws are used to attach/detach the base plate 201 to/from the body through the four holes 271, 273, 275, and 277. In another example embodiment, only six screws are used to attach/detach the base plate 201 to/from the body. This allows for easy maintenance and exchange of the components, while at the same time providing the needed structural integrity and connectivity of components to reduce vibrations and maintain a stable platform. A single, unified base plate 201 simplifies the manufacturing process and provides better stability for higher precision printing. The compact design of the movement system allows a large printing area within a compact frame. In some embodiments, the size of the base plate is approximately 9.5 inches by 9.5 inches, but the printing area can be as large as 5 inches by 5 inches.

Figure 2C:
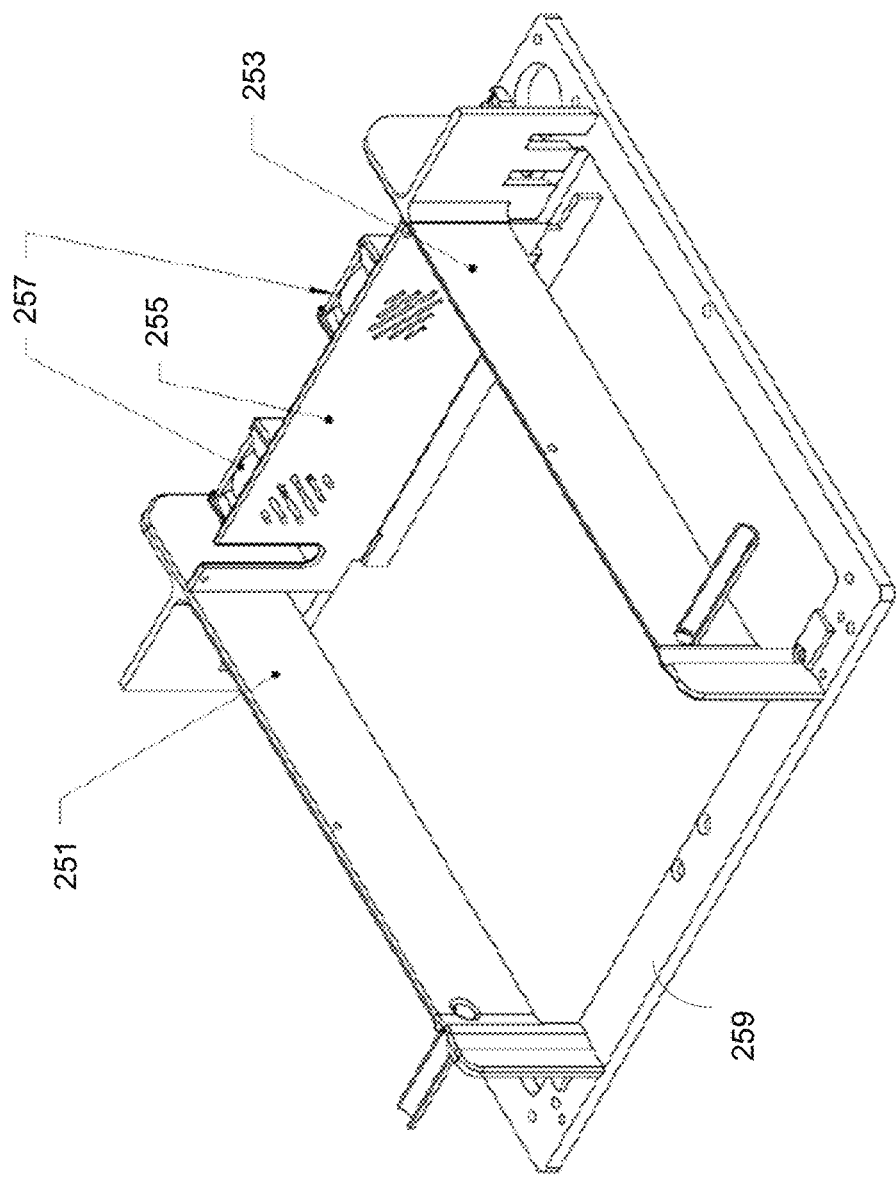
FIG. 2C shows exemplary support frames for a base plate in accordance with one or more embodiments of the present technology.
Figure 2D:
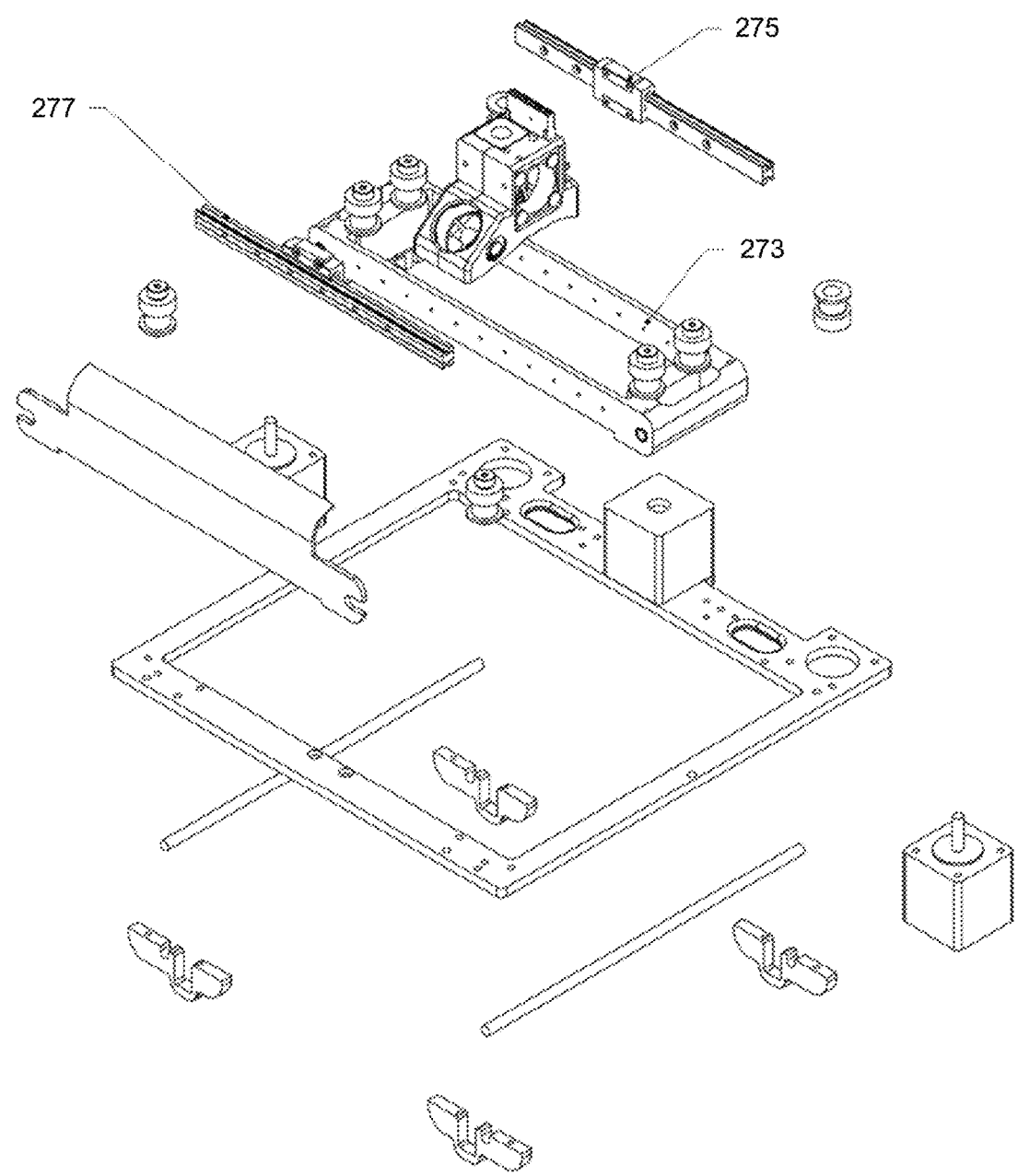
FIG. 2D illustrates another exemplary embodiment of the movement system in accordance with one or more embodiments of the present technology.

FIG. 2D illustrates another exemplary embodiment of the movement system in accordance with one or more embodiments of the present technology. In this embodiment, X axis movement is facilitated using linear rails 277 as opposed to linear rods 207 of FIG. 2B. As shown in FIG. 2D, the linear carriages 275 are positioned on and move on the linear rails 277. A frame 273 is also provided for the X-axis and extrusion system movement. This structure can be more immune to vibrations and provides for a steady movement of the extrusion system.

Figure 2E:
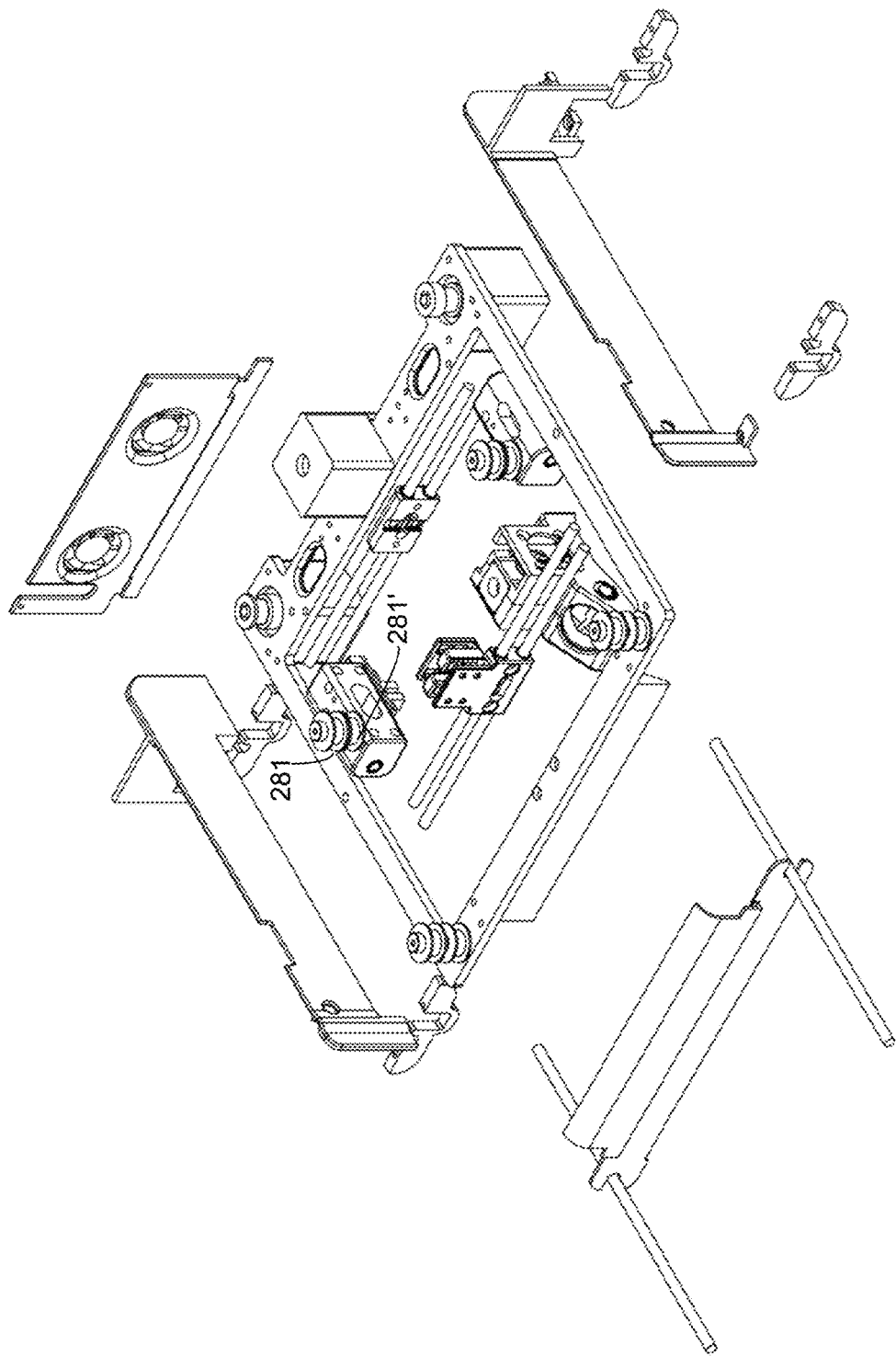
FIG. 2E shows another exemplary embodiment of the movement system in accordance with one or more embodiments of the present technology.

FIG. 2E shows another exemplary embodiment of the movement system in accordance with one or more embodiments of the present technology. In this embodiment, the belts and the pulleys are designed to be compatible with the CoreXY technique. For example, two belts can be used to run through stacked pulleys (e.g., 281, 281') to achieve movements in X and Y directions. In some embodiments, the pulleys located near the corners of the movement system can be placed side by side (either in the X direction or in the Y direction) to reduce the tension in the belts, while at the same time providing a compact structure due to (1) stacked pulleys 281, 281' in the center of the printer, and (2) side-by-side placement of the pulleys that does not intrude into the internal printer space, as opposed to an offset placement along a 45-degree line that is the hallmark of the CoreXY systems.

FIG. 2F shows yet another exemplary embodiment of the movement system in accordance with one or more embodiments of the present technology. In this embodiment, improvements have been made to the movement system such that multiple pulleys (e.g., 267 and 267') can be stacked on top of each other to save space (as was also the case in the embodiment of FIG. 2E), thereby allowing a more compact design of the printer. In some embodiments, the pulleys located near the corners of the movement system (e.g., 261 and 261') can be stacked as well to achieve a compact design. In some embodiments, the pulleys located near the corners of the movement system (e.g., 261 and 261') can be placed side by side to release some of the tension of the one or more belts. As noted above, the side-by-side arrangement also allows a more compact design of the movement system as compared to a diagonal arrangement of the pulleys in typical CoreXY systems. In this particular embodiment, only ten pulleys are needed in the movement system. A single pulley is positioned close to each of the back corners. Two pulleys are positioned side-by-side near each of the two front corners of the movement system, and two sets of stacked pulleys are positioned in the middle of the movement system.

Figure 2G:
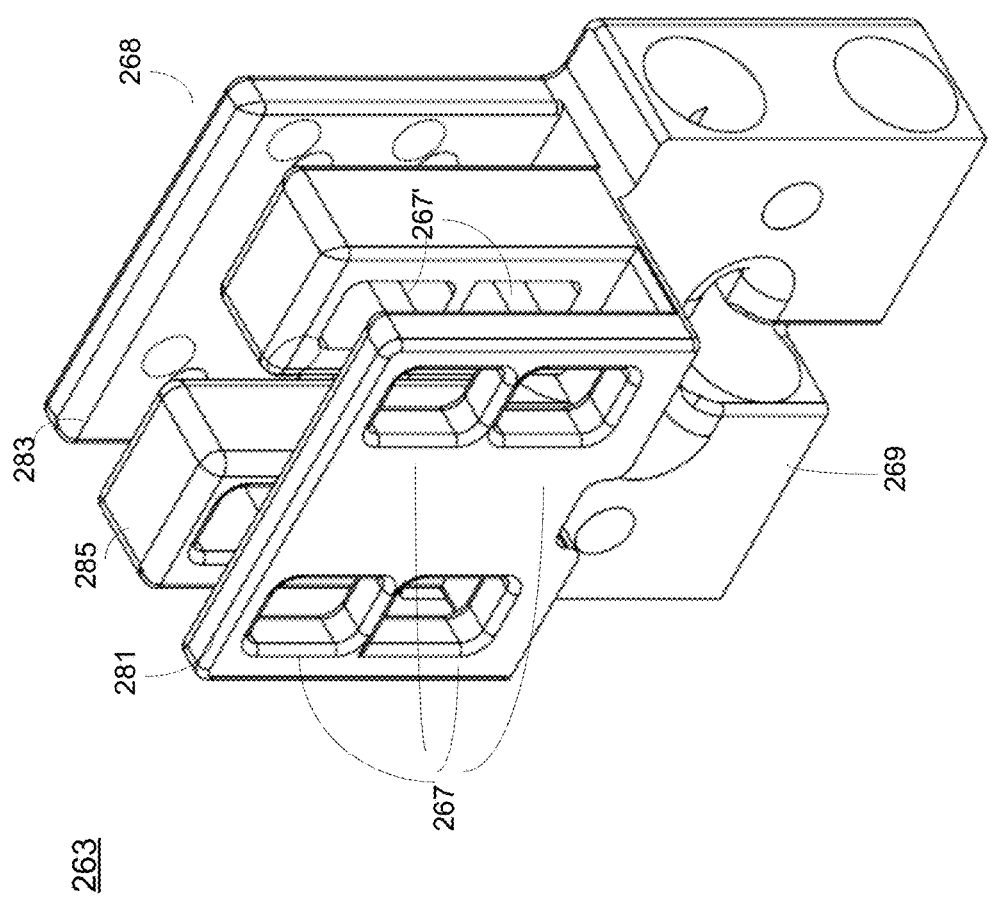
FIG. 2G shows an exemplary extruder carriage used in a movement system in accordance with one or more embodiments of the present technology.

The embodiment shown in FIG. 2F also includes an extruder carriage 263 assembly that is coupled to the extrusion system, which will be discussed below, and utilizes one or more belts 265 that are placed around the pulleys, as shown in FIG. 2F. As shown in FIG. 2G, the extruder carriage 263 includes an upper portion 268 and a lower portion 269. The upper portion 268 includes a first wall 281 and a second wall 283. The first wall 281 and second wall 283 are generally parallel to each other, and are generally parallel to the one or more belts when assembled. The upper portion 268 also includes a middle block 285 located at a distance from the first wall 281 and the second wall 283. The first wall 281 and the middle block 285 include multiple holes 267, 267' that allow multiple coupling means (such as screws 264 shown in FIG. 2F or pins) to be coupled to the extruder carriage 263. The screws 264 can be used to allow simple and easy securing and tension adjustment of the one or more belts 265. The lower portion 269 of the extruder carriage 263 is coupled to the extruder (not shown). In some embodiments, a single belt acts as both the upper belt 265 and the lower belt 265' of the movement system that is used in the CoreXY systems. The elimination of the additional belt reduces the cost of manufacturing, and also makes the securing and tension adjustment of the belt much easier. In some embodiments, two separate belts are used as the upper belt 265 and the lower belt 265'.

The one or more belts are placed around the pulleys and the tension can be adjusted by tightening or loosening the screws 264.

Figure 2H:
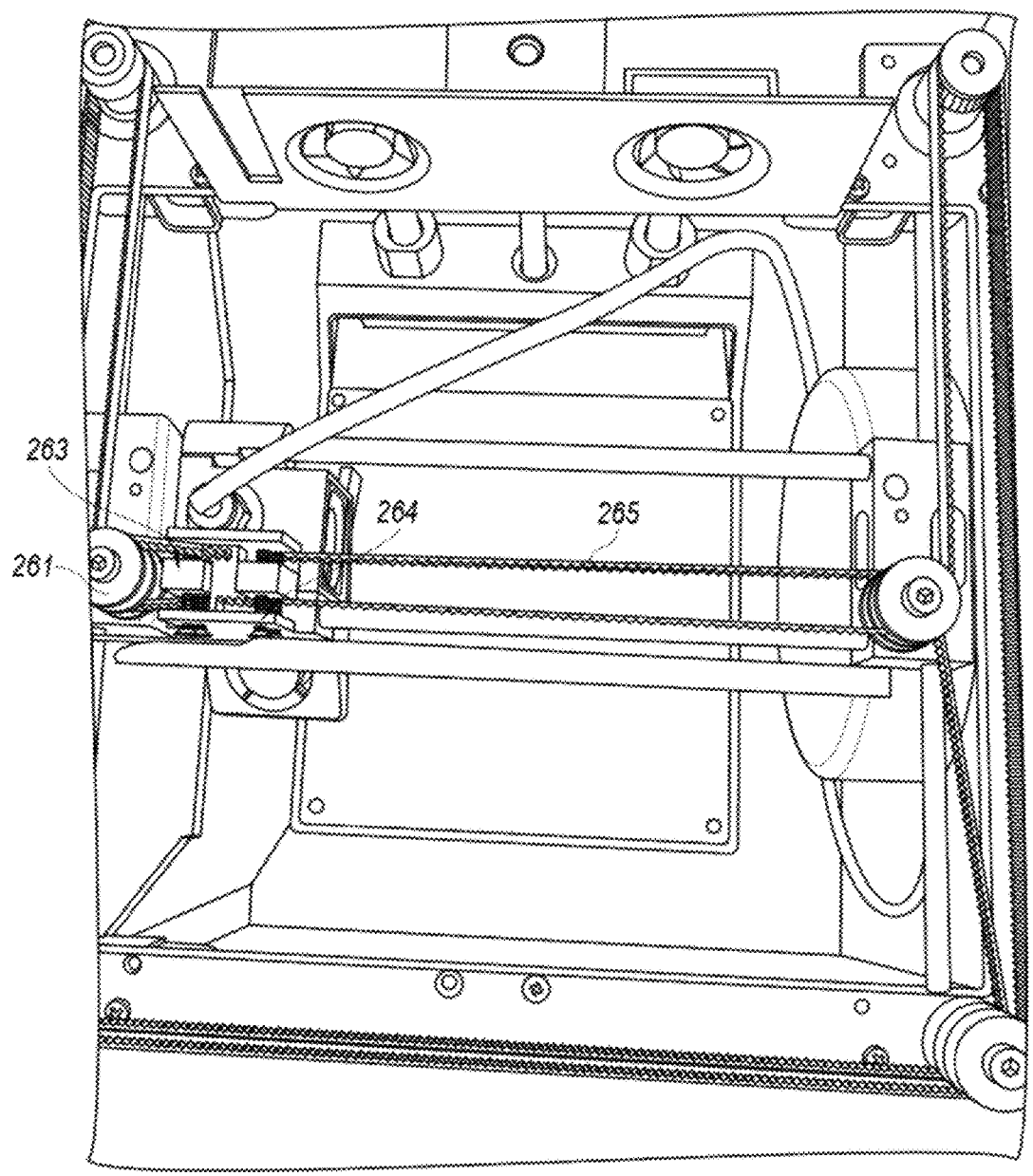
FIG. 2H shows an exemplary top view of a movement system in accordance with one or more embodiments of the present technology.
Figure 21:
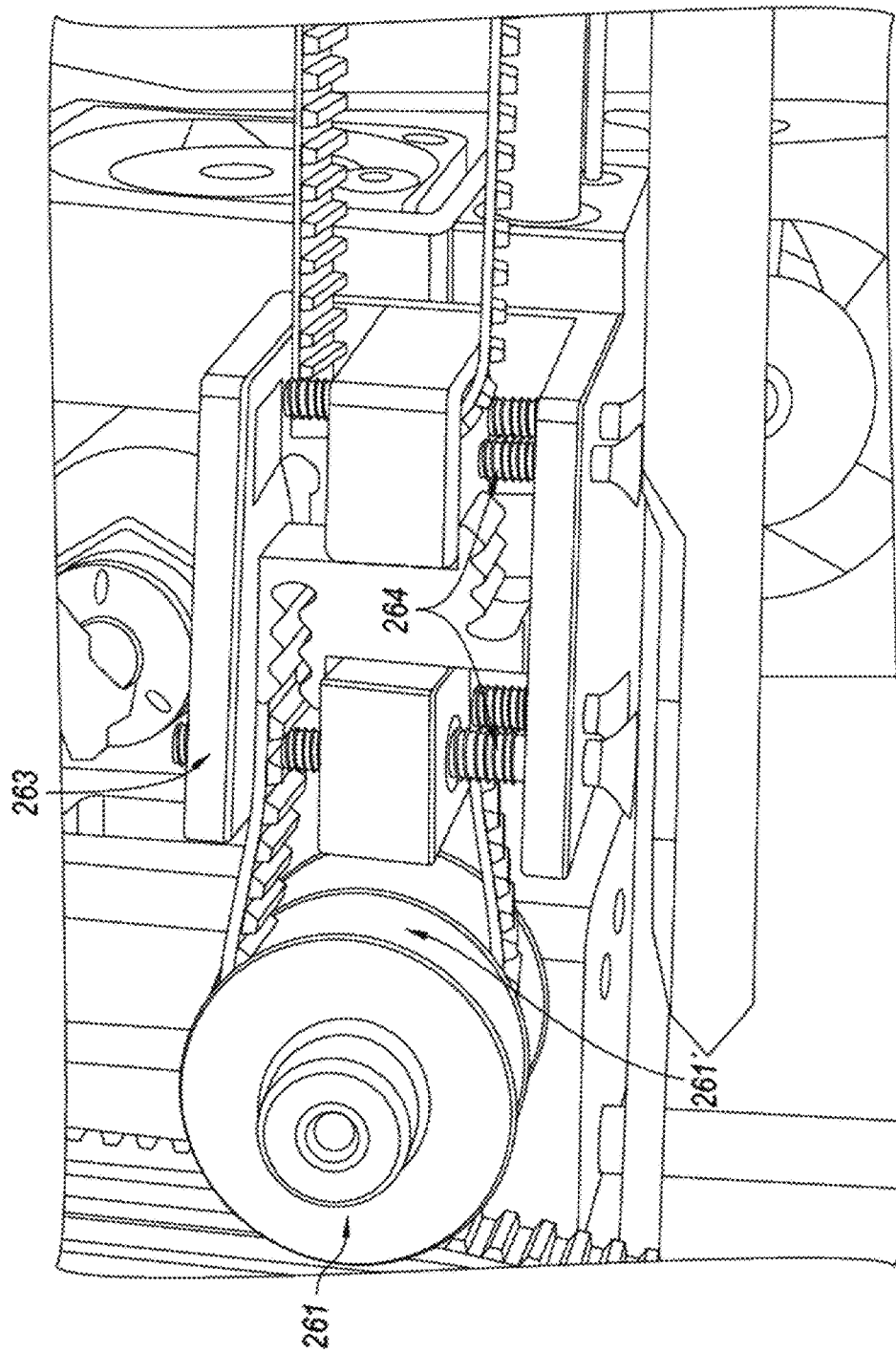

FIG. 2H shows an exemplary top view of a movement system in accordance with one or more embodiments of the present technology, and FIG. 2I shows a zoomed-in view of the movement system shown in FIG. 2H. Users can simply adjust the screws 264 on the extruder carriage 263 to secure and/or adjust tension of the belt, without any need to handle any open ends of the belt(s), to ensure precision of the movement system.

FIG. 2C shows exemplary support frames for a base plate in accordance with one or more embodiments of the present technology. Two side frames 251 and 253 are included in the printer body to stabilize the base plate 259. A third frame 255 is also be included as shown. One of the important considerations with any 3D printing system is to reduce the X-Y error in the movement of the print head. In particular, a small deviation (e.g., a fraction of the millimeter) can reduce the quality of the printed object. In this regard, the three frames 251, 253 and 255 of FIG. 2C provide structural integrity for platform and stabilize the base plate 201 so that it undergoes minimal trembling and movement as the heat extrusion system 203 travels in the X-Y direction. These frames also play the dual role of separating the heating elements (e.g., a heated build platform such 113 as shown in FIG. 1 and the extrusion system 203) from other components, such as motors, belts, and pulleys, to reduce or eliminate undesired heat transfer among the components. For example, the above noted frames reduce or eliminate the flow of heat from the electronic circuits and stepper motors to the main print area at the center of the printer, thereby improving the print quality.

In some embodiments, as shown in FIG. 2F, a single frame 287 extends across the base plate to provide structural support for the base plate. The frame 287 can further include vents 288 for accommodating two exhaust fans that allow proper ventilation of the printing exhaust. Details about the exhaust fans and the ventilation system will be discussed in further detail in connection with FIGS. 10-11 below.

Extrusion System

Figure 3A:
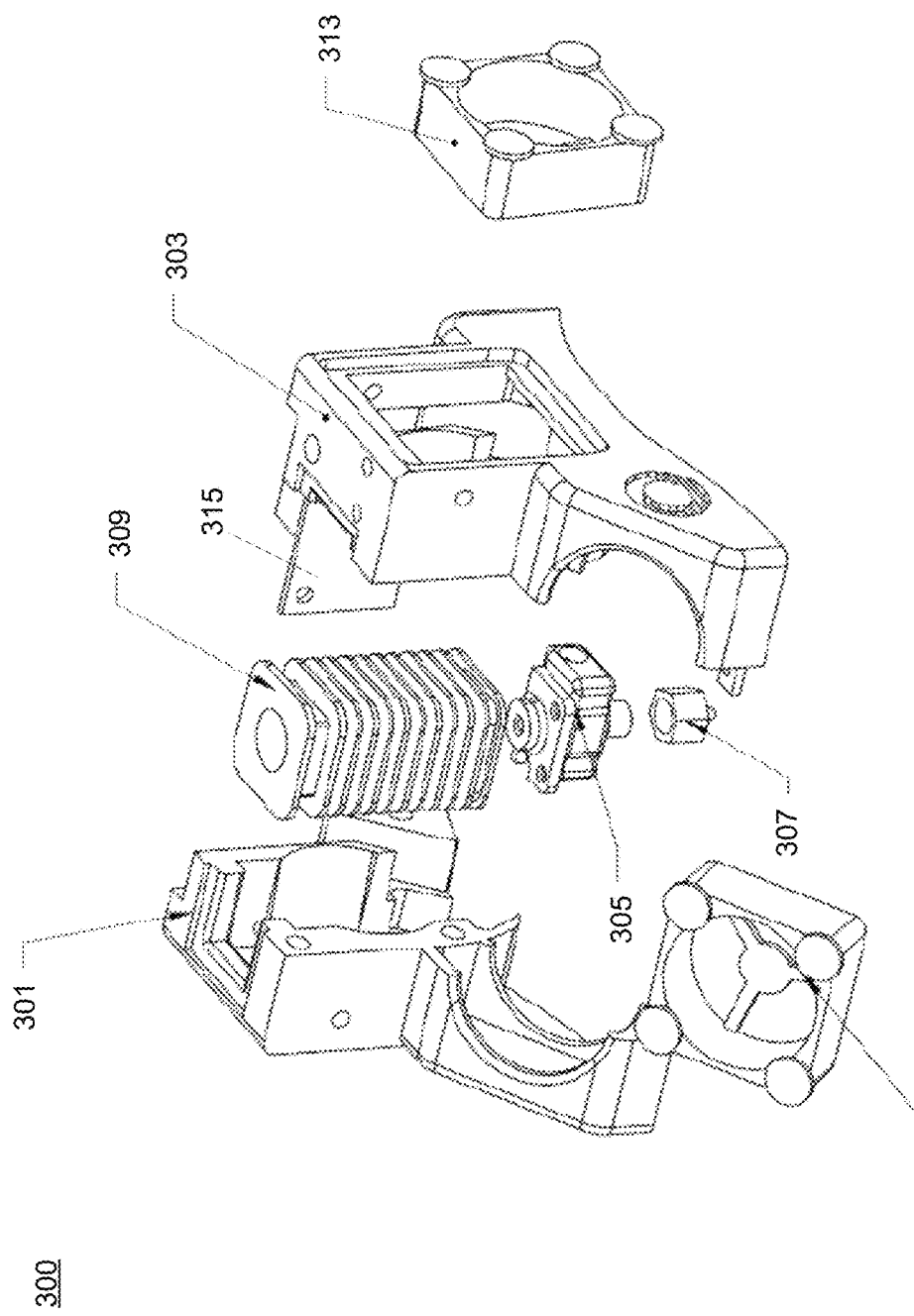
FIG. 3A shows an exploded view of an exemplary extrusion system in accordance with one or more embodiments of the present technology.

The extrusion system is one of the key components of the 3D printer. FIG. 3A shows an exploded view of an exemplary extrusion system 300 in accordance with one or more embodiments of the present technology. The extrusion system 300 includes a body, shown as the left half 301 and the right half 303. A heating block 305 is positioned within the body to heat up the printing material (e.g., the filament) and direct the material to the printing head 307 (e.g., a printing nozzle). To dissipate the heat generated by the heating block 305, a heat sink or heat dissipater 309 is positioned on top of the heating block 305. Additional fans, such as a front cooling fan 311 or side cooling fan(s) 313, can be included to allow more efficient cooling of the extrusion system 300.

Figure 3B:
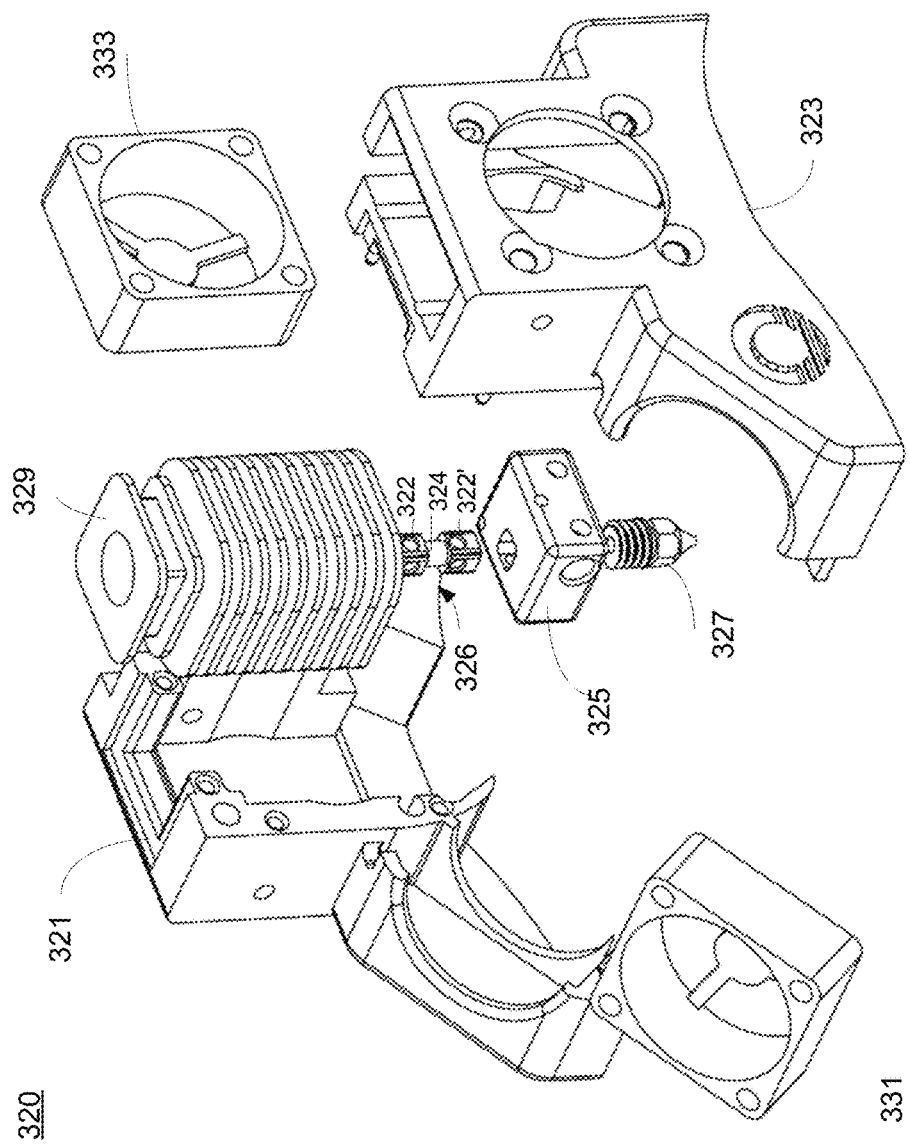
FIG. 3B shows another exploded view of an exemplary extrusion system in accordance with one or more embodiments of the present technology.

FIG. 3B shows another exploded view of another exemplary extrusion system 320 in accordance with one or more embodiments of the present technology. The extrusion system 320 includes a body, shown as the left half 321 and the right half 323. A heating block 325 is positioned within the body to heat up the printing material (e.g., the filament) and direct the material to the printing nozzle 327. A heat break 326 is coupled to the heating block 235 to reduce the amount heat passed from the heating block 325 to other components of the printer. The heat break 326 includes a first end 322, a second end 322', and a center 324. The first end 322 and the second end 322' have a larger cross-sectional area than the cross-sectional area of the center 324 so that the heat break 236 can effectively reduce the amount of transferred heat. In some embodiments, the heat break 326 and the heating block 325 form a single integrated component. To dissipate the heat generated by the heating block 325, a heat sink or heat dissipater 329 is positioned on top of the heat break 326. Additional fans, such as a front cooling fan 331 or side cooling fan(s) 333, can be included to allow more efficient cooling of the extrusion system 320. In this embodiment, the heating block 325 includes one or more holes so that it can be coupled to a heating element and a temperature sensor, which will be discussed in connection with FIGS. 5-7B.

When the 3D printer initially starts, the extrusion system 300 is ignorant about its own location with respect to other components of the system. By implementing various calibration mechanisms, the extrusion system 300 can re-position itself to a known location to facilitate subsequent printing.

For example, the extrusion system 300 can include a sensor board 315 (as shown in FIG. 3A) that holds a calibration sensor as one of its calibration mechanisms. In some embodiments, the calibration sensor is a contact sensor. The calibration sensor can be an electromagnetic energy sensor (e.g., an infrared (IR) sensor) in some implementations. The calibration sensor emits an electromagnetic beam (e.g., an infrared beam) towards the build platform positioned below the extrusion system 300 and receives a reflected signal from it.

Based on the received signal, the calibration sensor can calculate the distance from the extrusion system 300, more specifically, the tip of the printing nozzle 307, to the build platform. The extrusion system 300, therefore, can move along the Z direction so that the tip of the printing nozzle 307 reaches a desired initial position.

In some embodiments, the extrusion system 300 can perform, based on the results from the calibration sensor, auto-adjustment of the movement in the Z direction. For example, the calibration sensor can detect distances between the extrusion system and the build platform at different locations before the printing starts. Based on the measured distances, the movement of the extrusion system 300 along the Z direction can be adjusted to account for the unevenness of the build platform.

In some embodiments, the calibration sensor also senses the rotation of the extrusion system 300 in relation to the base plate to perform auto-leveling. In some embodiments, however, mechanical leveling of the extrusion system 300 is used and calibration sensor may not perform rotational sensing.

Manufacturing of the parts of the extrusion system can introduce imprecision and make it difficult to limit calibration error to a small range. For example, relying on the calibration sensor alone, it is difficult to constrain the calibration error within a 0.1 mm range. For a portable printer having a relatively limited printing area, even a small calibration error may have an adverse effect on the final printing products. Therefore, additional calibration mechanisms can be used in some implementations as a fine-tuning step to achieve a higher precision in print quality.

Figure 4:
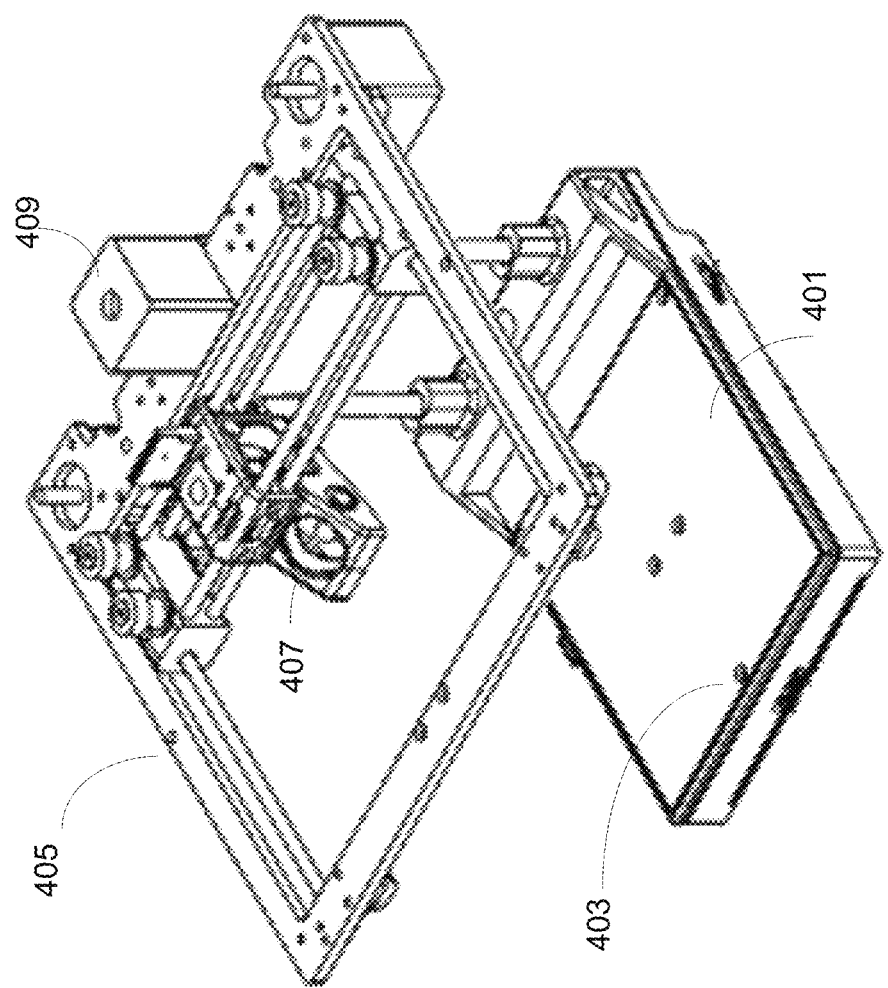
FIG. 4 shows an exemplary configuration for a calibration mechanism in accordance with one or more embodiments of the present technology.

FIG. 4 shows an exemplary configuration for a calibration mechanism in accordance with one or more embodiments of the present technology. In this configuration, the build platform 401 has a fiducial marker 403 (e.g., a metallic piece, a small screw, or the like) incorporated in its top surface. The fiducial marker 403 can be placed closer to the front of the build platform 401, as shown in this specific embodiment. The fiducial marker 403 can also be placed closer to the center or other locations of the build platform 401. The movement system 405 (that includes the base plate 201 and associated components shown in FIGS. 2A and 2B) is positioned above the build platform 401 and is capable of moving along the Z axis to adjust the position of the extrusion system 407. The extrusion system 407 includes a heating block and a printing nozzle in accordance with the description above. The extrusion system 407 first conducts a coarse calibration using a calibration sensor, which allows the printing nozzle to move within a close range of the fiducial marker 403 located on the build platform 401. The Z-direction motor 409 then further drives the extrusion system 407 in the negative Z direction such that the nozzle touches the fiducial marker 403. This allows the extrusion system 407 to establish a precise starting position for subsequent printing.

It should be noted that in some embodiments, calibration and leveling operations may be performed at the factory. In such embodiments, additional calibration and leveling (at the consumer premises) may not be necessary. Such a factory-only calibration and sensing may be particularly applicable to 3D printers having a small form factor, where the extrusion system is not required to travel large distances.

Heating Block and Nozzle

Figure 5:
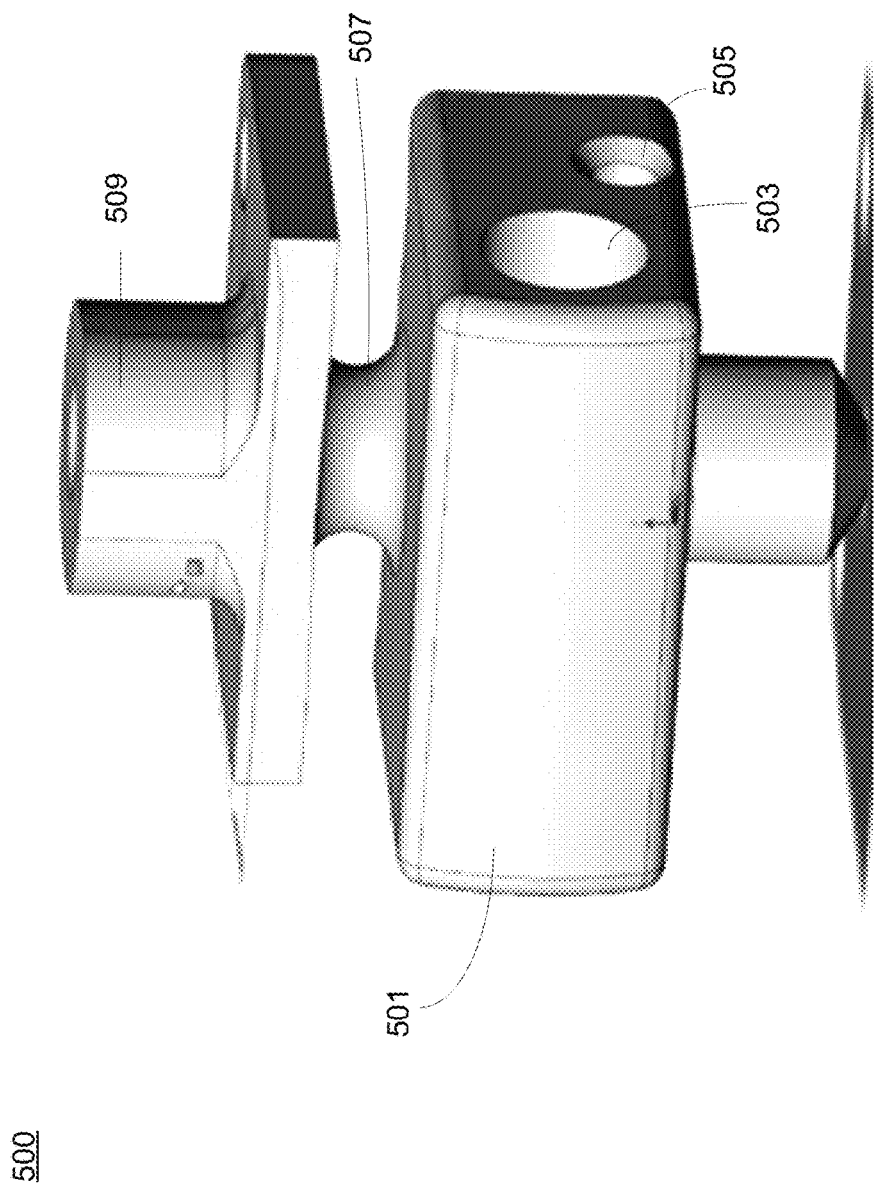
FIG. 5 shows an isometric view of an exemplary heat block in accordance with one or more embodiments of the present technology.

FIG. 5 shows an exemplary heating block that is part of the extrusion system in accordance with one or more embodiments of the present technology. The heating block 500 includes a top portion 509 that can be coupled to a cartridge supply system (e.g., tubes and conduits that are connected to the cartridge). The top portion 509 is capable of feeding the printing filament from the cartridge supply to a body 501. In this specific embodiment shown in FIG. 5, the body 501 has a cuboid shape. The body 501 includes at least two holes: a first (e.g., bigger) hole 503 that can be coupled to a small-sized heating element in order to heat up the printing filament, and a second (e.g., smaller) hole 505 that can be coupled to a temperature sensor to ensure that the printing filament is heated to a proper temperature.

The heating block also includes a heat break portion 507 between the top portion 509 and the body 501. The heat break portion 507 prevents excessive heat to reach the core control system of the 3D printer. The heat break portion 507 is also designed to be an integrated part of the heating block 500 to reduce the cost in manufacturing and assembly.

Figure 6:
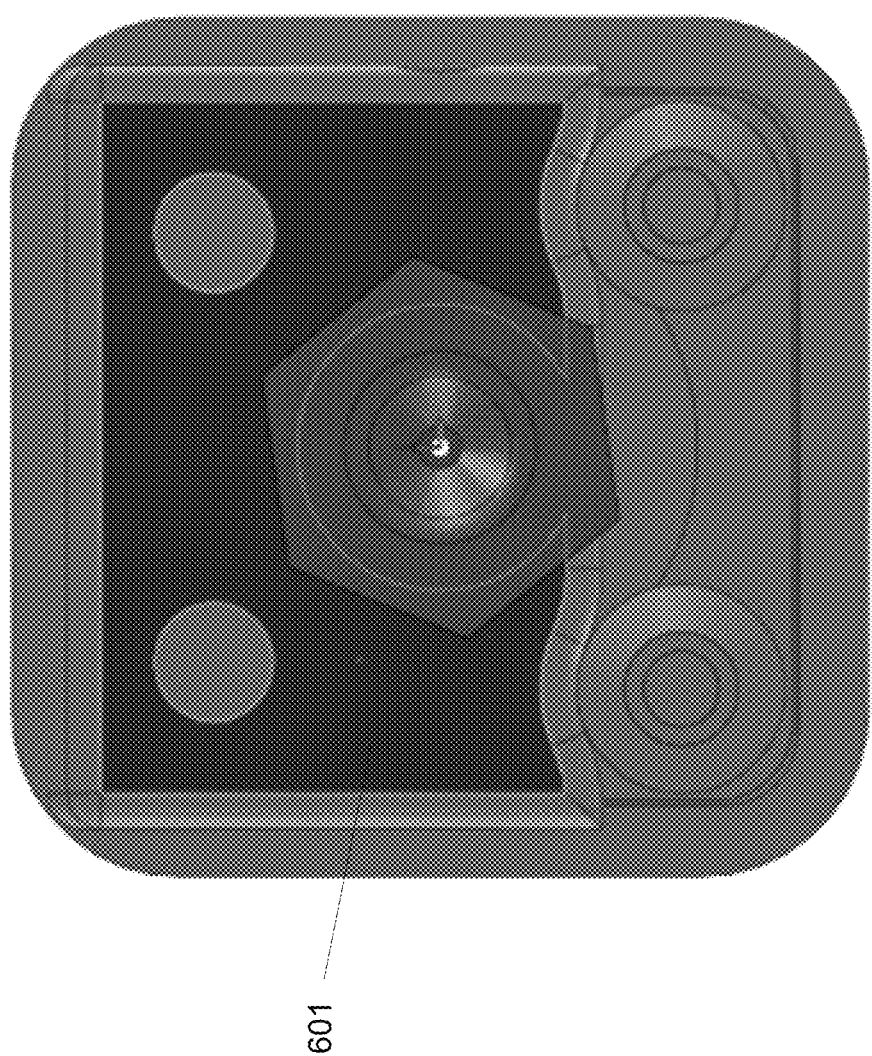
FIG. 6 shows a small heated area at the bottom of an exemplary heating block in accordance with one or more embodiments of the present technology.

Compared to the existing heating blocks, such as an open source version that has a size of 24 mm×16 mm×12 mm, the size of the heating block in accordance with the present technology is greatly reduced. In some embodiments, the heating block 507 has a size of 16 mm×11 mm×6 mm. In one advantageous aspect, the heating block 507 is specifically designed to reduce the amount of heated surface area of the heating block 507 that can interact with the printed object underneath the extrusion system and to thereby improve the print quality. FIG. 6 shows a heated area 601 at the bottom of an exemplary heating block in accordance with one or more embodiments of the present technology. As evident from FIG. 6, the heated area 601 is confined to within the middle to upper section of the of the figure and is further occluded by the printing nozzle, which further reduces that heat transfer region that can adversely affect the print quality. For example, the heated area 601 has a size of less than 15 mm×10 mm, and is further effectively reduced (for heat transfer considerations) by the cross-sectional area of the nozzle (e.g., 5×5 mm). In some embodiments, the cross-sectional area of the nozzle is around 30%-40% of the heated area. The printed object underneath the extrusion system, therefore, is under minimal impact by the heat generated from the heated area 601.

Figure 7A:
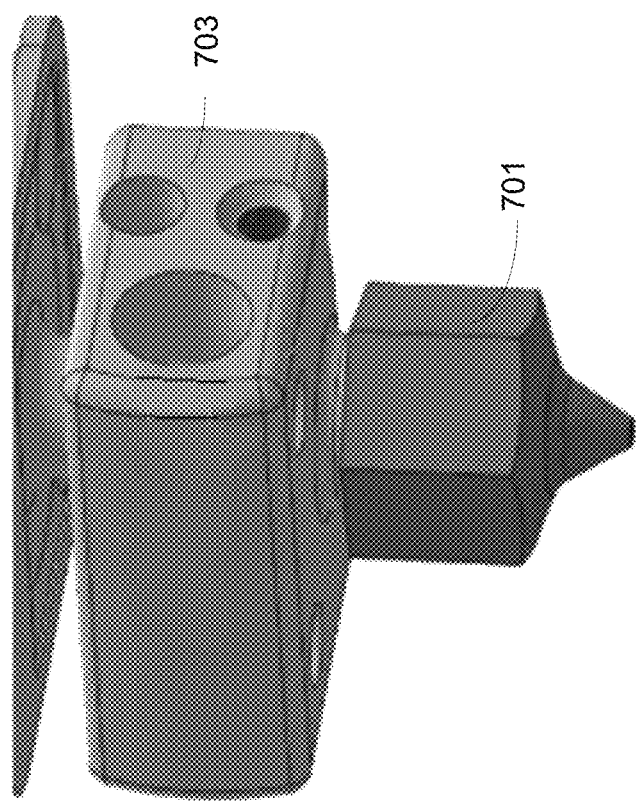
FIG. 7A shows an exemplary printing nozzle coupled to a heating block in accordance with one or more embodiments of the present technology.

FIG. 7A shows another exemplary printing nozzle coupled to a heating block in accordance with one or more embodiments of the present technology. The interior of the printing nozzle 701 includes threads that allow the printing nozzle 701 to be secured to the heating block 703. Such a configuration allows nozzle exchange to be as easy as un-screwing the printing nozzle 701 and replacing it with a different nozzle. Such a design brings great flexibility to customers, allowing them to select from a range of nozzles (e.g., nozzles of different diameters, or shapes) to achieve desired printing effects.

Figure 7B:
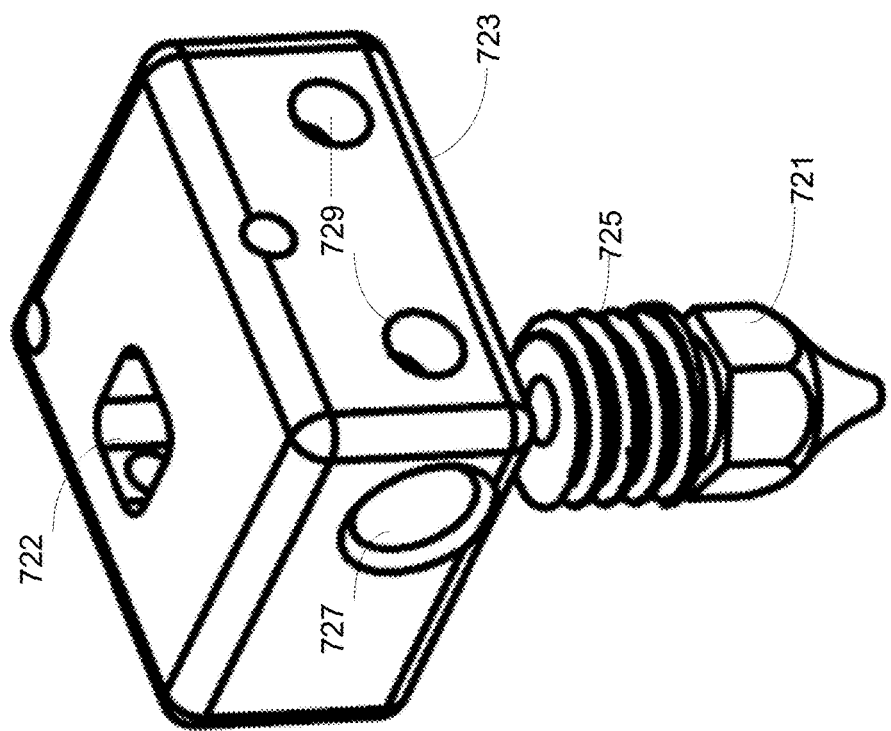
FIG. 7B shows another exemplary printing nozzle and a heating block in accordance with one or more embodiments of the present technology.

FIG. 7B shows an exemplary printing nozzle and a heating block in accordance with one or more embodiments of the present technology. The printing nozzle 721 includes threads 725 that allow the printing nozzle 721 to be secured to the heating block 723. Such a configuration allows nozzle exchange to be as easy as un-screwing the printing nozzle 721 and replacing it with a different nozzle. In this particular example, a hole 727 is located at one side of the heating block 723, and two (e.g., smaller) holes 729 are located at another side of the heating block 723. The hole 727 can be coupled to a small-sized heating element to heat up the printing filament. The small holes 729 can be coupled to one or more sensors to ensure that the printing filament is heated to a proper temperature. A heat break (not shown) can be coupled to the heating block 723 via the hole 722. In some embodiments, the heat break and the heating block 723 form a single integrated component for easier manufacturing and assembly.

Cartridge Ejection System

Figure 12A:
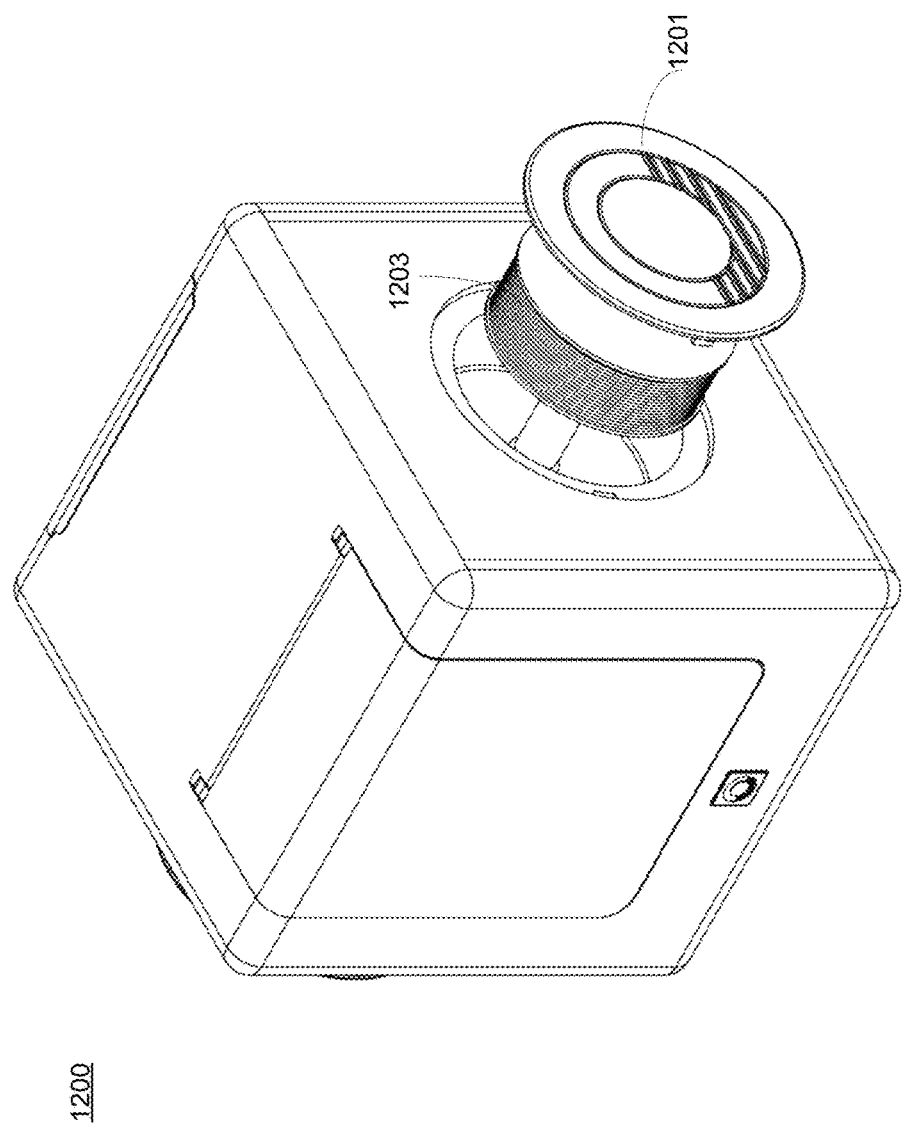
FIG. 12A shows an example of a spool system in accordance with one or more embodiments of the present technology.
Figure 12B:
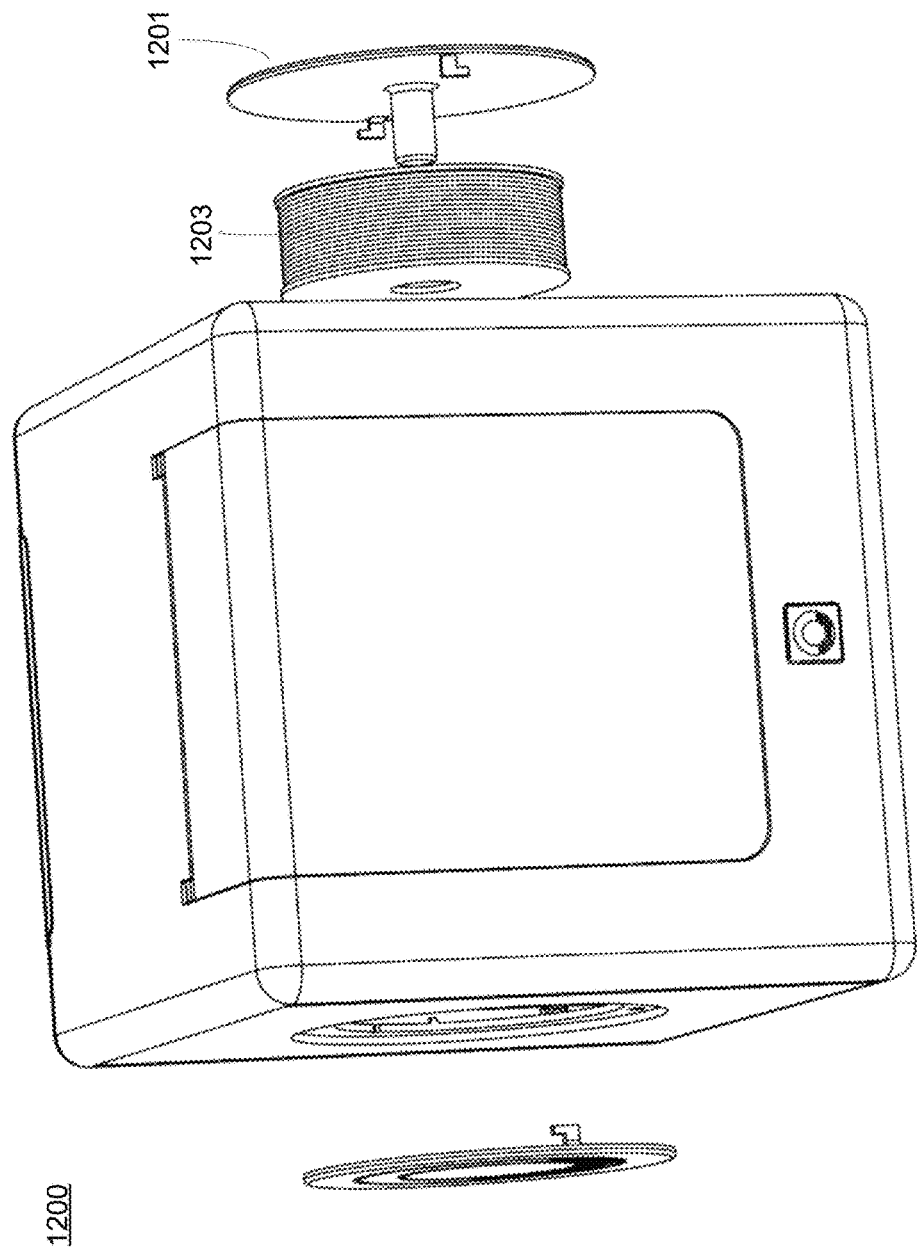
FIG. 12B shows an exploded view of a spool system in accordance with one or more embodiments of the present technology.

The portable 3D printer includes a cartridge ejection system to allow exchange of the cartridge by simply pushing and rotating the cartridge. FIG. 8A shows an exemplary cartridge ejection system 800 that is positioned at one side of the printer body in accordance with one or more embodiments of the present technology. It should be noted that FIG. 8A also shows a cut-away view of a front door that covers a front aperture in the printer body and allows a user to access the internal space of the printer to, for example, remove the printed objects from the build platform. A full example of a similar door is shown in FIGS. 12A and 12B.

Figure 8B:
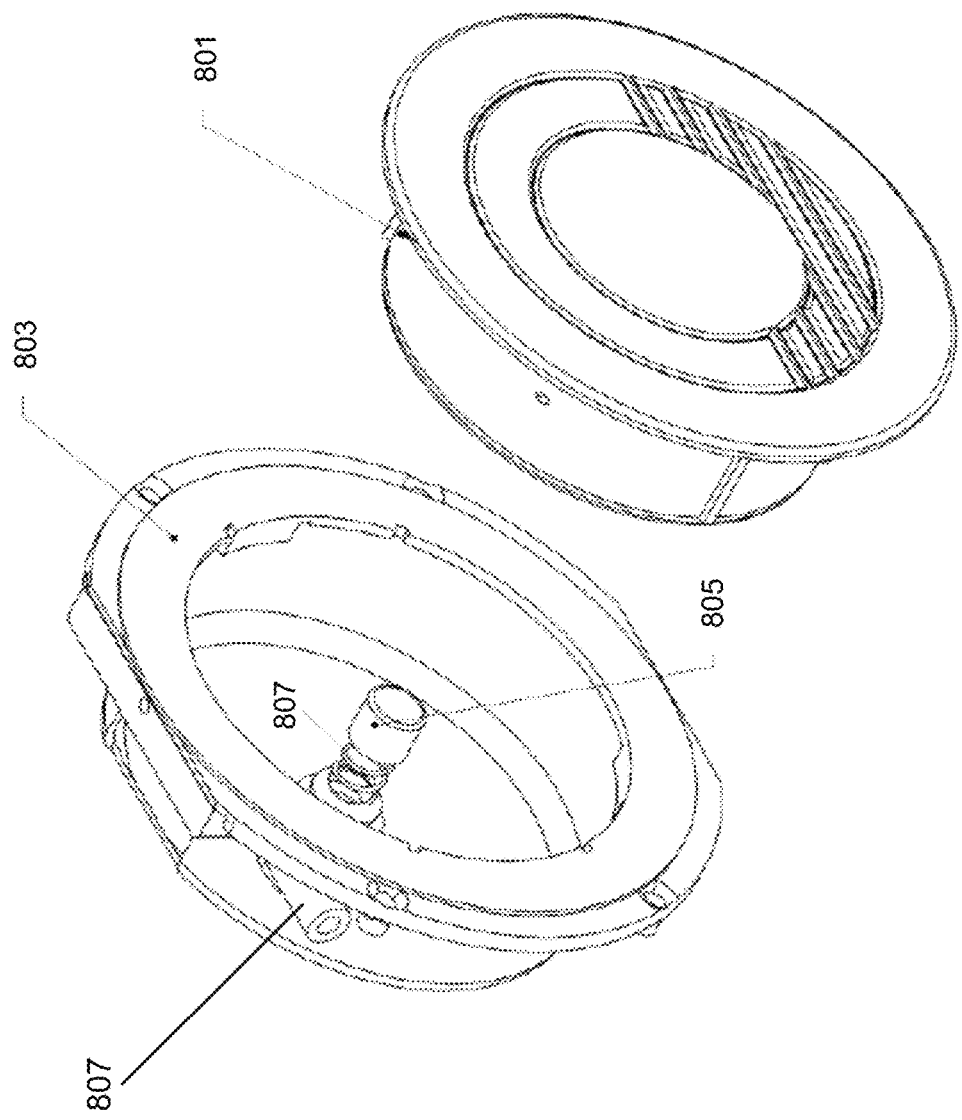
FIG. 8B shows a detailed view of an exemplary cartridge ejection system in accordance with one or more embodiments of the present technology.

FIG. 8B shows a detailed view of an exemplary cartridge ejection system in accordance with one or more embodiments of the present technology. A printing cartridge 801 is also shown in FIG. 8B. The cartridge ejection system 800 includes a filament cartridge housing 803 and an ejection mechanism. The ejection mechanism, in some embodiments, includes a spring-loaded ejection pin comprising an ejection pin 805 and a corresponding spring 807. With such an ejection mechanism, the printing cartridge 801 can be removed by simply rotating the printing cartridge 801. The printing cartridge 801 is then unlocked and the spring-loaded ejection pin 805 ejects the cartridge 801 out. Similarly, a printing cartridge can be installed by pushing the cartridge 801 against the spring-loaded ejection pin and rotating the cartridge 801 to lock it in place.

The filament from the printing cartridge is fed through a guide 807 and may pass through additional tubings or guides inside of the 3D printer before being fed into a filament drive system 115 that is depicted in FIG. 1. The filament drive system 115, which can be secured to the bottom cover for the body 114, receives the filament (e.g., through one of the depicted holes on the side of the filament drive system 115) and includes a drive motor that pushes or feeds the filament to the extrusion system.

Spool System

In some embodiments, the portable 3D system includes a spool system instead of a cartridge system. FIG. 12A shows an example of a spool system 1200 in accordance with one or more embodiments of the present technology. The spool system 1200 includes a side cover 1201 that has a pole to keep a spool of the printing material 1203 in place. Similar to the cartridge system, the filament from the spool 1203 is fed through a guide (such as guide 807 shown in FIG. 8) and may pass through additional tubings or guides inside of the 3D printer before being fed into a filament drive system 115 that is depicted in FIG. 1.

FIG. 12B shows an exploded view of a spool system 1200 in accordance with one or more embodiments of the present technology. In order to replace or exchange printing materials (e.g., using different colors to have different customized designs), users can simply take out the side cover 1201, pull out the existing spool 1203, put in a new spool (not shown), and close the side cover 1203 to secure the new spool in place.

Heated Build Platform

Figure 9A:
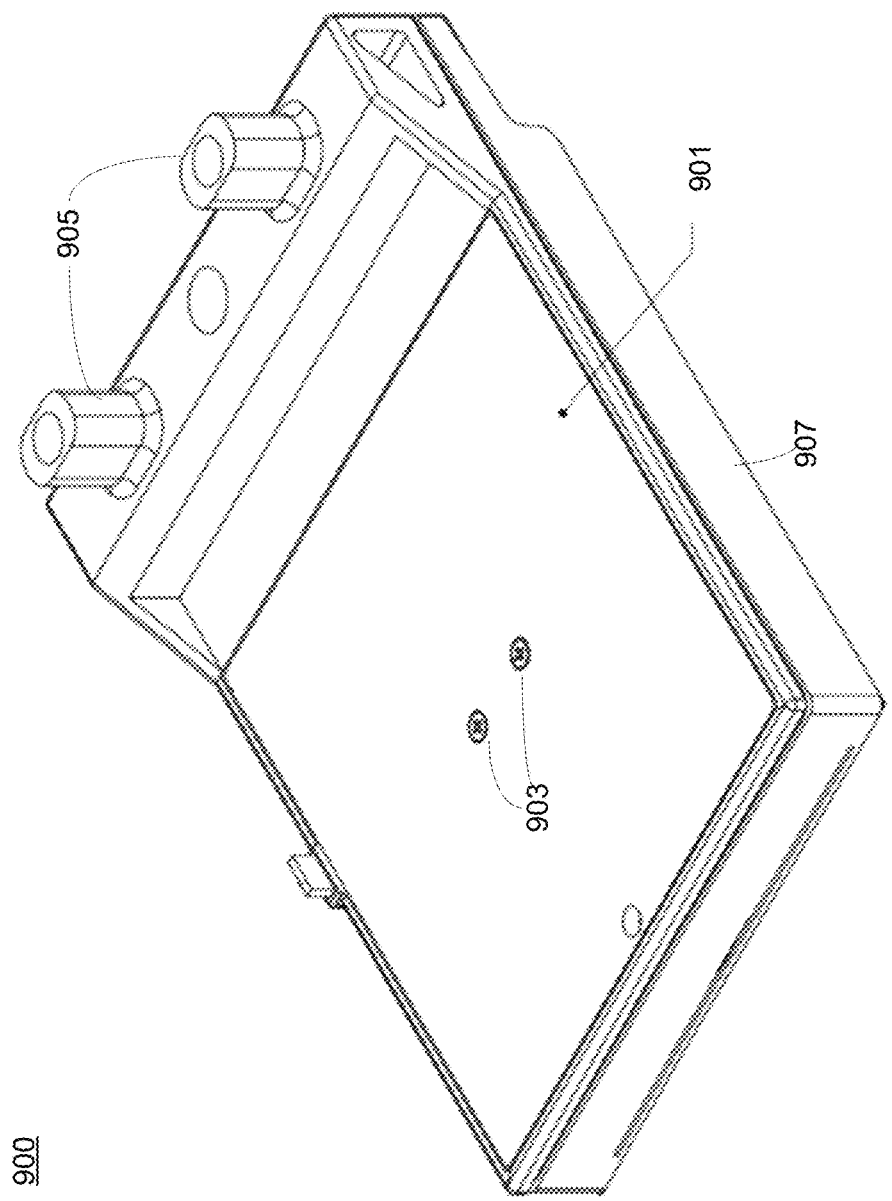
FIG. 9A shows an exemplary build platform in accordance with one or more embodiments of the present technology.

In some embodiments, the portable 3D printer also includes a heated build platform. FIG. 9A shows an isometric view of an exemplary build platform in accordance with one or more embodiments of the present technology. The heated build platform 900 can include two bearing housings 905 to allow the heated build platform 900 to be coupled with the movement system in accordance with the description above. The heated build platform also includes a center build plate 901. In some implementations, the center build plate 901 has a width greater than 5 inches (e.g., 5.1 inches) and a length greater than 5 inches (e.g., 6 inches) so that it provides sufficient printing area for use at homes, offices, and classrooms.

In some embodiments, the center build plate 901 includes three layers: a bottom layer that includes a heating element to heat up the entire build plate 901, a middle plate (e.g., an aluminum plate) to provide structural support for the build plate 901, and a top Polyetherimide (PEI) layer to provide a smooth, plastic like printing surface. The use of aluminum and PEI allows the center build plate 901 to be strong and light to achieve high quality printing with efficiency.

In some embodiments, the center build plate 901 is secured to the platform base 907 by one or more coupling means 903 (e.g., screws or pins) located at the center of the build plate 901. The center build plate 901 can be heated using the bottom heater layer. However, the middle aluminum layer expands in different directions when it is heated by the bottom heater layer. Positioning the coupling means 903 (e.g., screws or pins) at the center of the build plate 901 ensures that there are no warping or other types of deformations of the aluminum layer when the build plate 901 is heated. To allow for such an expansion, the aluminum layer is positioned at the center of the build plate 901 such that there is a gap of approximately 1 mm between the edges of the aluminum layer and the edges of the frame that surrounds the build plate 901.

Figure 9B:
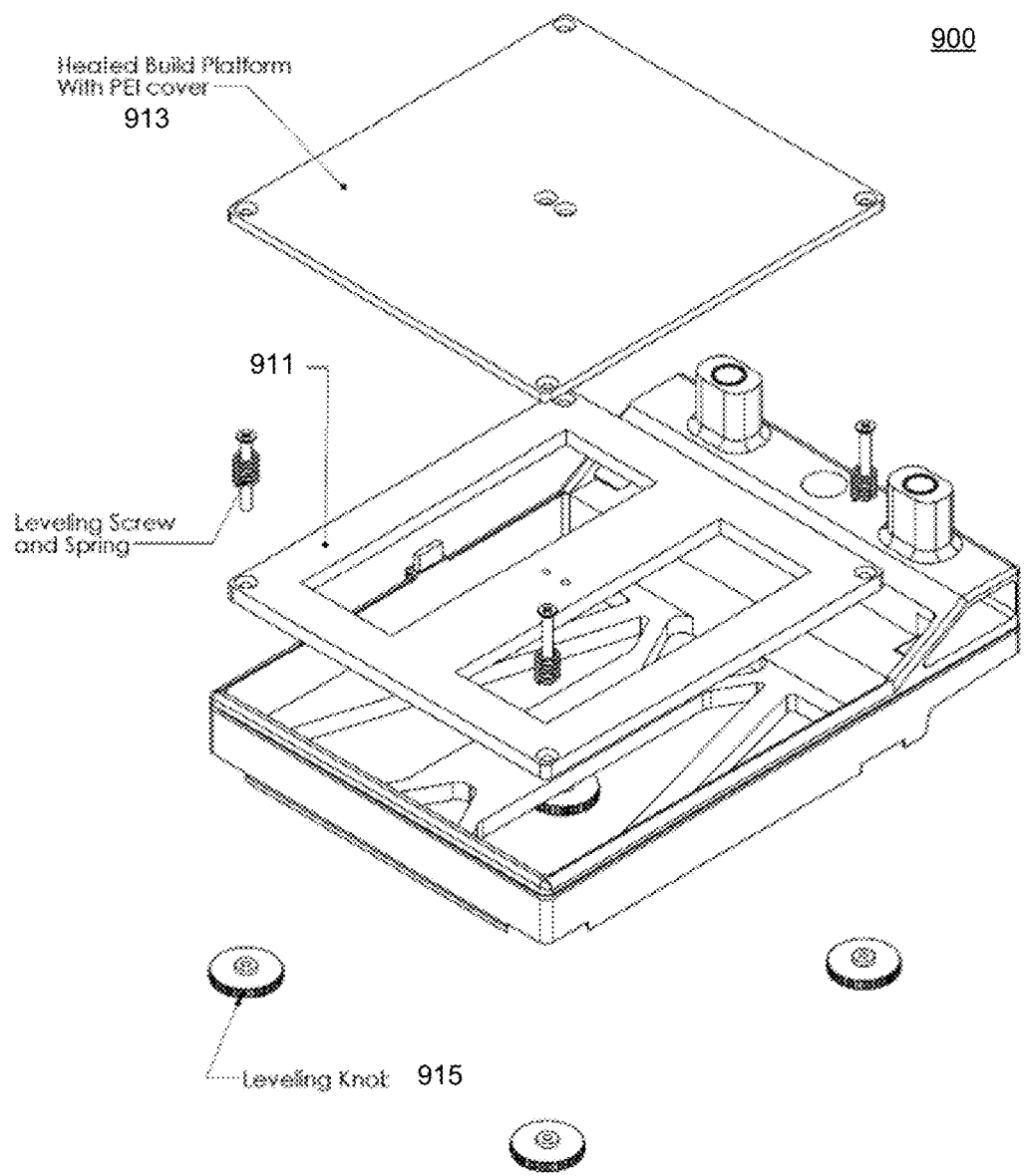
FIG. 9B shows some of the internal component of an exemplary build platform in accordance with one or more embodiments of the present technology.

FIG. 9B shows some of the internal component of an exemplary build platform 900 in accordance with one or more embodiments of the present technology. The embodiment of FIG. 9B includes a leveling mechanism. In particular, a leveling adapter 911 is provided. The leveling adapter 911 is made of material such as high-temperature plastic that can withstand the heat produced by the heating elements. An aluminum plate and the associated PEI cover 913 are positioned on top of the leveling adaptor. In particular, the aluminum plate is connected to the center of the leveling adapter 911 (e.g., via two screws that connect to through the depicted holes in the center of the leveling adaptor). Since the aluminum plate is attached to the leveling adapter 911 only in the center, the aluminum can expand mostly in the X-Y direction. This exemplary build platform 900 also allows for leveling of the platform. The leveling points are at the edges of the platform base, providing for the adapter 911 to be attached to the bed structure at four corners (via the leveling screw and spring (not shown), and leveling knobs 915). The leveling knobs 915 can be adjusted to effectuate the proper manual leveling. As such, the components of the build platform 900 are specifically designed so the they allow for the aluminum to expand in only X and Y directions without affecting the Z direction, while allowing the platform to be leveled through the leveling adapter.

Figure 9C:
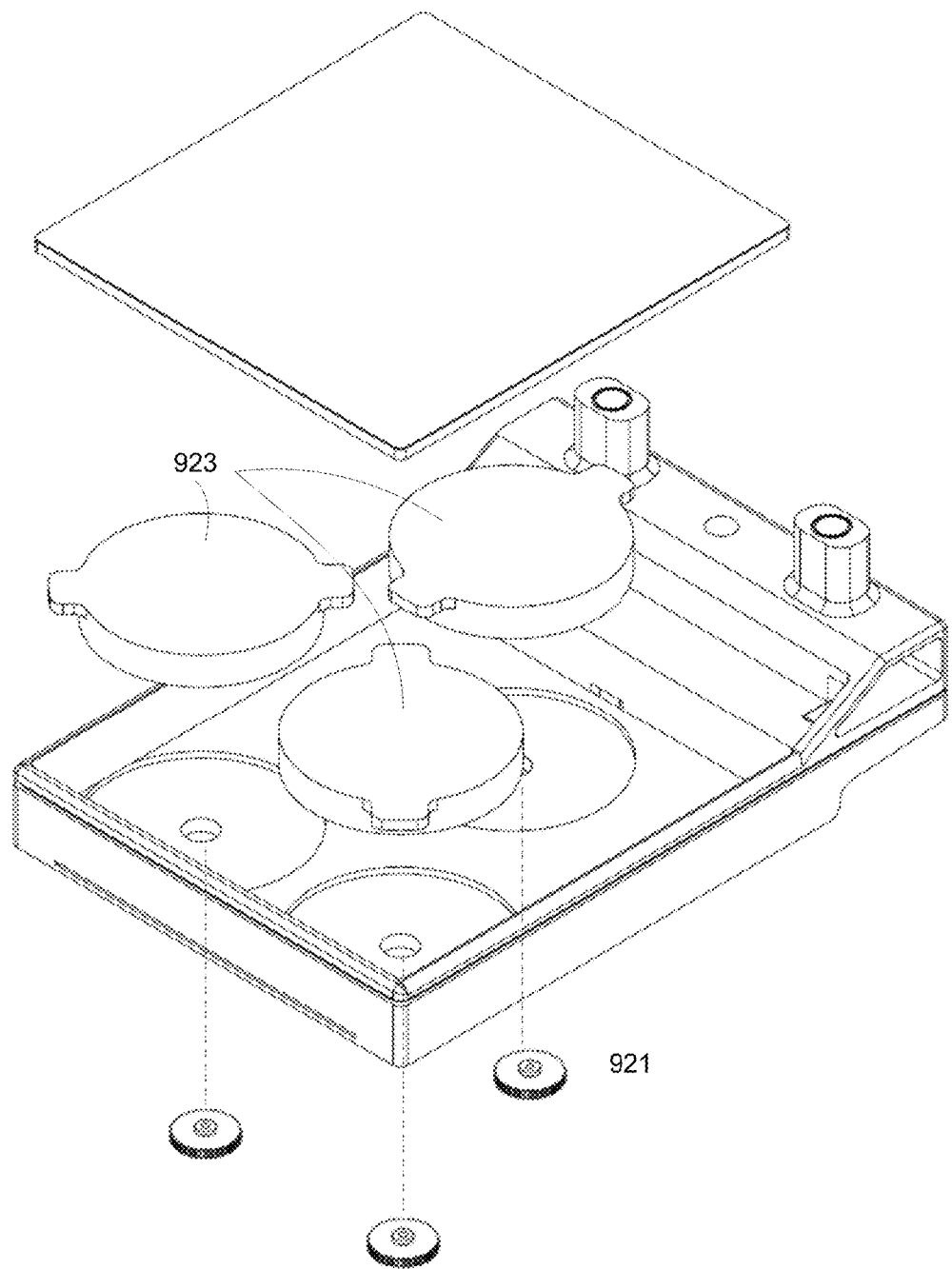
FIG. 9C shows an example of an auto-leveling mechanism including several leveling motors in accordance with one or more embodiments of the present technology.

FIG. 9C shows an example of an auto-leveling mechanism in accordance with one or more embodiments of the present technology. In this example, three leveling points are positioned across the build platform, with two leveling points located at the front corners of the platform, and one leveling point located at the back of the platform. Each of the leveling points includes a leveling knob 921. While in some embodiments manual adjustment of the leveling points (or areas) can be used, in some embodiments the leveling mechanism includes one or more leveling motors 923. The leveling motors 923 can be stepper motors, AC motors, or other types of motors that are coupled to the leveling adjusters to allow vertical up/down movement of the leveling points. In some embodiments, as shown in FIG. 9C, each of the leveling motors 923 has a circular shape. Based on the results from the calibration sensor (e.g., taking an average of the sensed data at three leveling points), each of the motors 923 can move independently to move the left front corner, right front corner, and/or the back of the platform up and down to level the platform. In some embodiments, four or more leveling points and corresponding leveling motors can be used. For example, a larger platform may need more than three leveling points to ensure its proper auto-leveling. The auto-leveling mechanism saves the users from performing manual leveling multiple times, and provides a more consistent leveled platform to build accurate 3D models. In use, prior to the starting each print job (or at, e.g., regular intervals after a predetermined number of prints), the auto leveling procedure is carried out during which a contact sensor (or another type of sensor) moves across the print bed and measures at least the height of at least three points on the bed. Subsequently, each of the motors can be activated to slightly tilt the section of the bed up or down in order to provide a substantially flat printing surface.

Ventilation System

Figure 10:
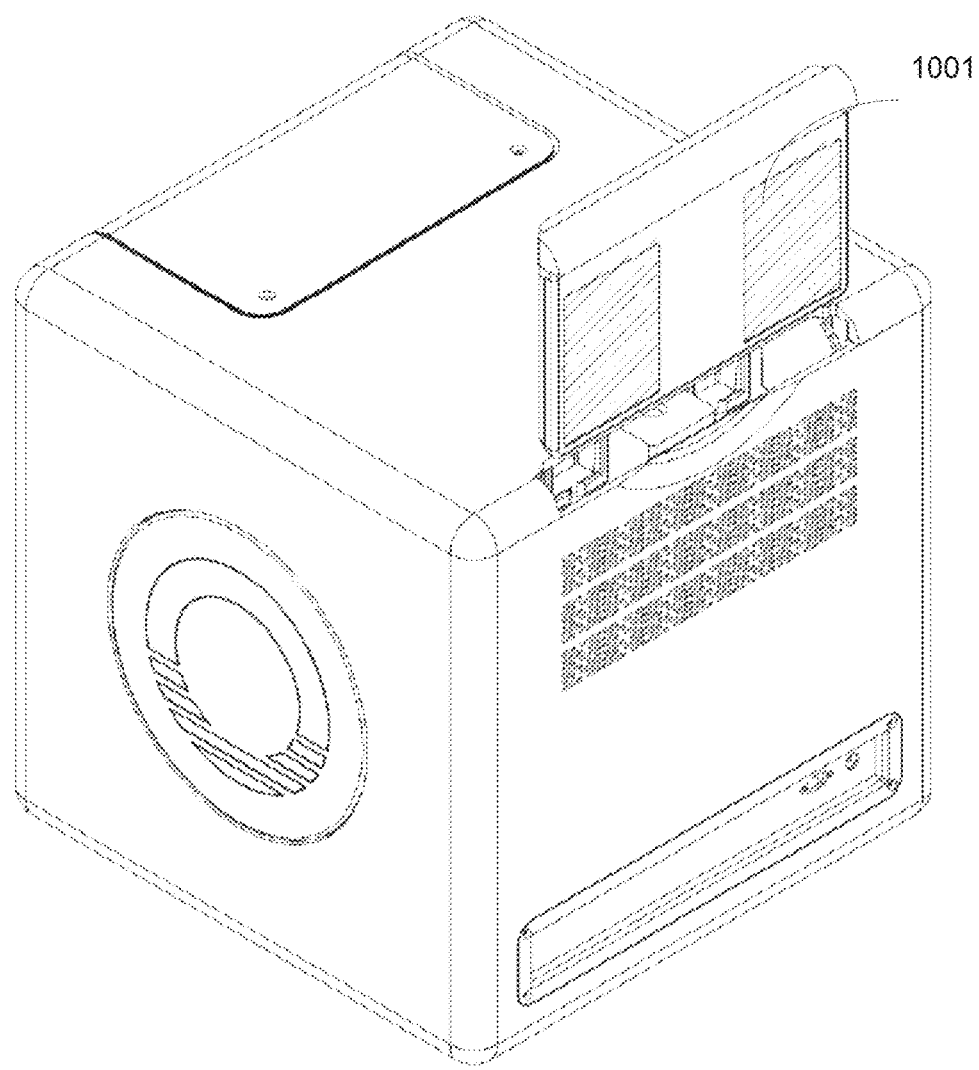
FIG. 10 shows an exemplary filtered ventilation system positioned at the back of the printer body in accordance with one or more embodiments of the present technology.

The portable 3D printer also includes a filtered ventilation system. FIG. 10 shows an exemplary ventilation system positioned at the back of the printer body in accordance with one or more embodiments of the present technology. The ventilation system can ventilate the printing exhaust to the outside of the printer. The ventilation system includes vents and fans (see FIGS. 1 and 2C), as well as the filter assembly 1001 that is configured to slide into and out of the printer. The vents on the outside body of the printer allow the air from the inside of the printer to be ventilated to the outside environment.

Figure 11:
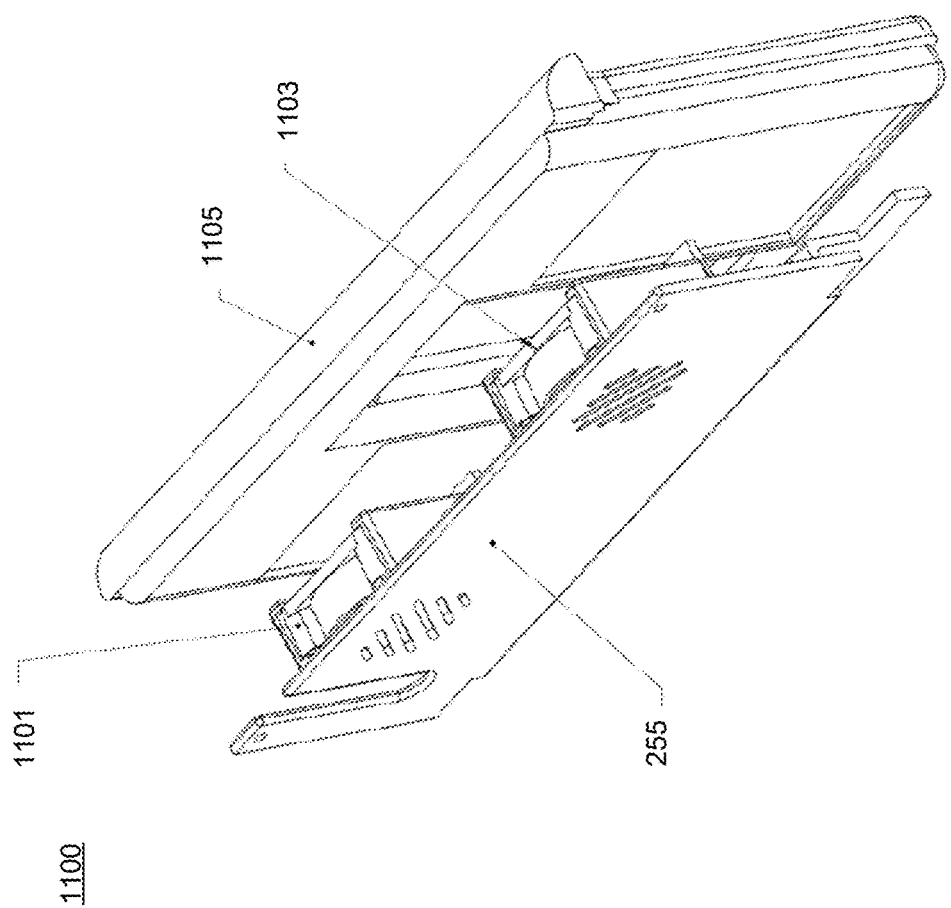
FIG. 11 shows an exploded view of another exemplary filtered ventilation system in accordance with one or more embodiments of the present technology.

FIG. 11 shows an exploded view that includes more details of an exemplary filtered ventilation system 1100 in accordance with one or more embodiments of the present technology. The filtered ventilation system includes two exhaust fans 1101 and 1103 coupled to a back support frame (as shown in FIG. 2C). The two exhaust fans are positioned symmetrically with respect to a center line of the movement system to avoid uneven distribution of air within the printing body, and to provide a symmetrical structure within the 3D printer that provides a better weight balance. The exhaust fans 1101 and 1103 can also be placed in close proximity to the two stepper motors 215 as shown in FIGS. 2A-2B so that the stepper motors 215 can be cooled by the exhaust fans at the same time.

The filtered ventilation system 1100 also includes a filter housing 1105 to allow a filter assembly to slid in and out. The filter (e.g., a High Efficiency Particulate Air (HEPA) filter) inside the filter assembly can filter the printing exhaust before it gets ventilated outside of the printer body to ensure that the printing exhaust does not interfere with indoor air quality. Such a filtered ventilation system makes it much safer to use the 3D printer indoors at homes, offices, or classrooms.

In one exemplary aspect, a portable three-dimensional (3D) printer is disclosed. The printer includes a material supply system including a spool or a cartridge to supply printing material to a print engine of the 3D printer. The print engine including an extrusion system that comprises a heating block. The heating block includes a top portion coupled to the material supply system to receive the printing material, a heating body positioned below the top portion, and a heat break portion positioned between the top portion and the heating body. The heating body is coupled to a heating element operable to supply heat to the heating body and heat up the printing material, the heating body further coupled to a temperature sensor operable to sense a temperature of the heating body. The heat break portion includes a first end in contact with the top portion, a second end in contact with the heating body, and a center. Each end has a larger cross-sectional area than a cross-sectional area of the center to reduce heat transfer from the heating body to other components of the 3D printer. The portable 3D printer includes a movement system that comprises an extruder carriage positioned to carry the extrusion system, multiple pulleys, and one or more belts in contact with each of the multiple pulleys and with the extruder carriage to allow a horizontal movement of the extruder carriage. Each pulley is positioned to rotate around a vertical axis, and at least two of the multiple pulleys are stacked on top of one another to allow a compact design of the movement system. The portable 3D printer includes a build platform positioned below the movement system to receive the printing material from the extrusion system; and a printer body that encloses the extrusion system, the movement system, and the build platform. The printer body includes an aperture to allow access to an internal space of the 3D printer.

In some embodiments, extrusion system comprises a printing head positioned to facilitate extrusion of the printing material onto the build platform. The print head has a cross-sectional area that further reduces heat transfer from the heating block to the build platform. In some implementations, the cross-sectional area of the printing head is 30%-40% of a heated area of the heating block.

In some embodiments, the extrusion system comprises a removable printing head coupled to the heating body, the removable printing head positioned to receive the heated printing material from the heating body and direct the printing material to the build platform.

In some embodiments, the movement system includes only ten pulleys. A first pulley and a second pulley are stacked on top of each other, and a third pulley and a fourth pulley are stacked on top of each other. In some embodiments, the movement system includes a first pulley and a second pulley stacked on top of each other and movable within the internal space of the 3D printer, a third pulley and a fourth pulley stacked on top of each other and movable within the internal space of the 3D printer, a fifth pully and a sixth pulley placed side-by-side in a first corner within the internal space of the 3D printer, and a seventh pulley and an eighth pulley placed side-by-side in a second corner within the internal space of the 3D printer. The fifth and the sixth pulleys positioned with respect to each other with either an offset in an X-direction in a horizontal plane or an offset in a Y-direction in the horizontal plane but not having an offset in both X- and Y-directions. The seventh and the eighth pulleys positioned with respect to each other with either an offset in the X-direction in the horizontal plane or an offset in the Y-direction in the horizontal plane but not having an offset in both X- and Y-directions.

In some embodiments, the build platform includes a build plate including one or more holes positioned in proximity to a center of the build plate, a platform base located beneath the build plate, and one or more coupling means that pass though the one or more holes of the build plate to secure the build plate to the platform base.

In some embodiments, the build plate comprises a bottom layer including a heating element operable to heat up the build plate, a middle layer positioned on the bottom layer to provide structural support for the build plate, and a top layer configured to provide a smooth printing surface.

In some embodiments, the build platform further comprises a leveling adapter positioned under the build plate, the leveling adapter including multiple leveling points located in proximity to corners of the leveling adapter; and multiple leveling knobs coupled to the multiple leveling points of the leveling adapter to allow the build plate to be leveled through the leveling adapter.

In some embodiments, the extrusion system includes a calibration sensor positioned to obtain a distance between the extrusion system and the build platform and is configured to detect a rotational movement of the extrusion system in relation to the build plate. In some implementations, the calibration sensor includes a contact sensor or an infrared sensor.

In some embodiments, the build platform further comprises a fiducial marker on the build plate configured to enable the calibration sensor to obtain the distance, and three or more leveling motors positioned under and coupled to the build plate, each of the leveling motors configured to receive a signal from the calibration sensor and to adjust the build plate according to the signal.

In some embodiments, the material supply system comprises a removable spool of the printing material, and a cover positioned to secure the removable spool to the 3D printer. In some embodiments, the portable 3D printer further includes a ventilation system positioned at a side of the printer body to ventilate printing exhaust from the extrusion system. The ventilation system includes one or more fans positioned symmetrically with respect to a center line of the portable 3D printer to improve stability, and a removable filter assembly configured to accommodate a filter for filtering the printing exhaust from the one or more fans.

In some embodiments, a total volume of space occupied by the portable 3D printer is approximately 1000 cubic inches, and a usable area of the build platform for printing 3D objects is approximately 5 inches by 5 inches.

In another exemplary aspect, a portable 3D printer includes a material supply system including a spool or a cartridge to supply printing material to a print engine. The print engine includes an extrusion system positioned to receive the printing material from the material supply system. The portable 3D printer includes a movement system that comprises one or more belts, multiple pulleys in contact with the one or more belts, and an extruder carriage in contact with the one or more belts. Each pulley is positioned to rotate around a vertical axis, and at least two of the multiple pulleys are stacked on top of one another to allow a compact design of the movement system. The extruder carriage is positioned to carry the extrusion system and comprises an upper portion in contact with the one or more belts to allow a horizontal movement of the extruder carriage and a lower portion coupled to the extrusion system. The upper portion includes a first wall generally parallel to the one or more belts, a second wall generally parallel to the first wall, a center portion located between the first wall and the second wall and spaced apart from the first wall and the second wall, and one or more coupling means that can adjustably pass through at least a section of the extruder carriage to make contact with a section of the one or more belts and to allow a tension adjustment of the one or more belts. The portable 3D printer includes a build platform positioned below the movement system to receive the printing material from the extrusion system, and a printer body positioned to enclose the extrusion system, the movement system, and the build platform. The printer body includes a movable door to allow access to the build platform.

In some embodiments, the one or more coupling means are configured to pass through the first wall and the center portion before making contact with the one or more belts and pressing the one or more belts against the second wall. In some embodiments, the first wall includes four openings configured to allow the coupling means to pass therethrough.

In some embodiments, the extrusion system comprises a heating block. The heating block includes a top portion coupled to the material supply system to receive the printing material, a heating body positioned below the top portion, a heat break portion positioned between the top portion and the heating body. The heating body is coupled to a heating element configured to heat up the printing material and to a temperature sensor configured to sense a temperature of the heating body. The heat break portion is in contact with the top portion and with the heating body. The heat break portion has different cross-sectional areas along a longitudinal direction with larger cross-sectional areas at two ends of the heat break portion that contact the top portion and the heating body relative to a smaller cross-sectional area at a center of the heat break portion along the longitudinal direction.

In some embodiments, the extrusion system comprises a removable printing head that is removably coupled to the heating body. The removable printing head positioned to receive the heated printing material from the heating body and to direct the printing material to the build platform.

In some embodiments, the build platform includes a build plate. The build plate includes a bottom layer including a heating element configure to supply heat to the build plate, a middle layer positioned on the bottom layer to provide structural support for the build plate, a top layer configured to provide a smooth printing surface, and one or more holes positioned in proximity to a center of the build plate. The build platform includes a platform base located beneath the build plate, and one or more coupling means that pass though the one or more holes in proximity to the center of the build plate to secure the build plate to the platform base. One or more edges of the middle layer are spaced apart from a boundary of a frame that surrounds the build plate to prevent warping of the middle layer upon an expansion of the middle layer due to application of heat. In some embodiments, the middle layer includes an aluminum layer, and the top layer includes polyetherimide.

In some embodiments, the extrusion system includes a calibration sensor positioned to obtain a distance between the extrusion system and the build platform, the calibration sensor including an infrared sensor configured to detect an infrared light and produce electrical signals in response thereto. In some embodiments, the calibration system further including a processor and a memory including processor executable code, the processor executable code, when executed by the processor configures the processor to calculate a distance between the extrusion system and the build platform based at least on the electrical signals produced by the infrared sensor.

In some embodiments, the material supply system comprises a removable spool of the printing material, and a cover positioned to secure the removable spool to the 3D printer. The removable spool is accommodated in an opening within an internal space of the portable 3D printer such that upon insertion of the removable spool into the opening and placement of the cover, an external surface of the cover is flush with surrounding surfaces of an exterior of the portable 3D printer.

In some embodiments, the portable 3D printer includes a ventilation system positioned at a side of the printer body to remote printing exhaust from an internal space of the portable 3D printer to an outside environment. The ventilation system includes two fans positioned symmetrically around a center line of the portable 3D printer, and separated from at least some components in the internal space of the portable 3D printer by a plate disposed at across the internal space of the 3D printer. The ventilation system further includes a removable filter assembly facing the outside environment and configured to accommodate a High Efficiency Particulate Air (HEPA) filter.

In some embodiments, a total volume of space occupied by the portable 3D printer is approximately 1000 cubic inches, and a usable area of the build platform for printing 3D objects is approximately 5 inches by 5 inches.

In some embodiments, the portable 3D printer includes a single base plate. All components of the movement system are attachable to the single base plate. In some embodiments, all components of the movement system are formed as sub-assemblies and are attached to the base plate using six or fewer attachment means. In some embodiments, all components of the movement system are attached to the base plate using only four fastening means.

In another exemplary aspect, a portable 3D printer includes a material supply system including a spool or a cartridge to supply printing material to a print engine. The print engine including an extrusion system positioned to receive the printing material from the material supply system. The portable 3D printer includes a movement system that comprises an extruder carriage positioned to carry the extrusion system, multiple pulleys, and one or more belts in contact with each of the multiple pulleys and with the extruder carriage to allow a horizontal movement of the extruder carriage. Each pulley is positioned to rotate around a vertical axis, and at least two of the multiple pulleys are stacked on top of one another to allow a compact design of the movement system. The portable 3D printer includes a build platform positioned below the movement system to receive the printing material from the extrusion system. The build platform comprises a build plate that includes a bottom layer including a heating element operable to heat up the build plate, a middle layer positioned on the bottom layer to provide structural support for the build plate, and a top layer configured to provide a smooth printing surface. The build platform includes a leveling adapter positioned under the build plate, the leveling adapter including multiple leveling points located in proximity to corners of the leveling adapter, and multiple leveling knobs coupled to the multiple leveling points of the leveling adapter to allow the build plate to be leveled through the leveling adapter. The portable 3D printer includes a printer body that encloses the extrusion system, the movement system, and the build platform. The printer body includes an aperture to allow access to an internal space of the 3D printer.

In some embodiments, the extrusion system comprises a heating block. The heating block includes a top portion coupled to the material supply system to receive the printing material, a heating body positioned below the top portion, wherein the heating body is coupled to a heating element configured to heat up the printing material and to a temperature sensor configured to sense a temperature of the heating body, and a heat break portion positioned between the top portion and the heating body. The heat break portion is in contact with the top portion and with the heating body. The heat break portion has different cross-sectional areas along a longitudinal direction with larger cross-sectional areas at two ends of the heat break portion that contact the top portion and the heating body relative to a smaller cross-sectional area at a center of the heat break portion along the longitudinal direction.

In some embodiments, the extrusion system comprises a printing head positioned to facilitate extrusion of the printing material onto the build platform. The print head having a cross-sectional area that further reduces heat transfer from the heating block to the build platform. In some embodiments, the cross-sectional area of the printing head is 30%-40% of a heated area of the heating block. In some embodiments, the extrusion system further comprises a removable printing head coupled to the heating body. The removable printing head is positioned to receive the heated printing material from the heating body and direct the printing material to the build platform.

In some embodiments, the movement system includes only ten pulleys, and a first pulley and a second pulley are stacked on top of each other, and a third pulley and a fourth pulley are stacked on top of each other.

In some embodiments, the build plate includes one or more holes positioned in proximity to a center of the build plate, and the build platform further includes a platform base located beneath the build plate, and one or more coupling means that pass though the one or more holes of the build plate to secure the build plate to the platform base.

In some embodiments, a total volume of space occupied by the portable 3D printer is approximately 1000 cubic inches, and a usable area of the build platform for printing 3D objects is approximately 5 inches by 5 inches.

In some embodiments, the middle layer includes an aluminum layer, and the top layer includes polyetherimide. In some embodiments, the extrusion system includes a calibration sensor positioned to obtain a distance between the extrusion system and the build platform and is configured to detect a rotational movement of the extrusion system in relation to the build plate. In some implementations, the calibration sensor includes a contact sensor or an infrared sensor.

In some embodiments, the material supply system comprises a removable spool of the printing material, and a cover positioned to secure the removable spool to the 3D printer. In some embodiments, the portable 3D printer further includes a ventilation system positioned at a side of the printer body to ventilate printing exhaust from the extrusion system. The ventilation system includes one or more fans positioned symmetrically with respect to a center line of the portable 3D printer to improve stability, and a removable filter assembly configured to accommodate a filter for filtering the printing exhaust from the one or more fans.

In another exemplary aspect, a portable 3D printer is disclosed. The portable 3D printer includes a material supply system that comprises a removable spool of printing material and a cover, the cover positioned to secure the spool to the 3D printer. The material supply system configured to supply printing material to a print engine. The print engine includes an extrusion system that comprises a heating block. The heating block includes a top portion coupled to the material supply system to receive the printing material, a heating body positioned below the top portion. The heating body is coupled to a heating element operable to supply heat to the heating body and heat up the printing material. The heating body is further coupled to a temperature sensor operable to sense the temperature of the heating body. The heating block also includes a heat break portion positioned between the top portion and the body. The heat break portion has a first end in contact with the top portion, a second end in contact with the heating body, and a center. Each end has a larger cross-sectional area than a cross-sectional area of the center to reduce heat transfer from the heating body to other components of the 3D printer. The portal 3D printer includes a movement system that comprises one or more belts, multiple pulleys in contact with the one or more belts, and an extruder carriage in contact with the one or more belts. Each pulley is positioned to rotate around a vertical axis. At least two of the multiple pulleys are stacked on top of one another to allow a compact design of the movement system. The extruder carriage is positioned to carry the extrusion system and comprises an upper portion in contact with the one or more belts to allow a horizontal movement of the extruder carriage and a lower portion coupled to the extrusion system. The upper portion includes a first wall generally parallel to the one or more belts, a second wall generally parallel to the first wall, a center portion located between the first wall and the second wall and spaced apart from the first wall and the second wall, and one or more coupling means that can adjustably pass through at least a section of the extruder carriage to make contact with a section of the one or more belts and to allow a tension adjustment of the one or more belts. The 3D printer further includes a build platform that includes a build plate positioned below the movement system to receive the printing material from the extrusion system, and a printer body positioned to enclose the extrusion system, the movement system, and the build platform. The printer body includes an aperture to allow access to an internal space of the 3D printer.

Figure 13:
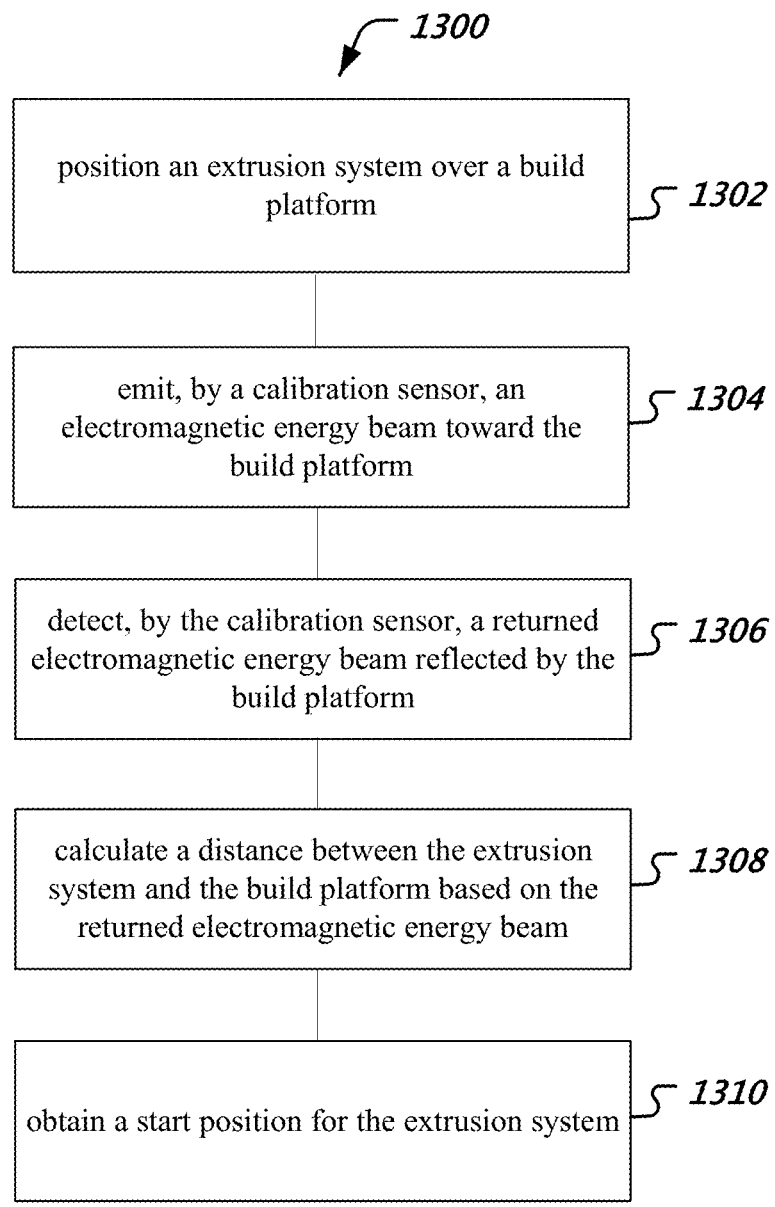
FIG. 13 is a flowchart representation of a method for calibrating a 3D printer in accordance with an exemplary embodiment.

FIG. 13 is a flowchart representation of a method 1300 for calibrating a 3D printer. The method 1300 includes, at block 1302, positioning an extrusion system of the 3D printer over a build platform of the 3D printer. The method 1300 includes, at block 1304, emitting, by a calibration sensor carried in the extrusion system, an electromagnetic energy beam toward the build platform. The method 1300 includes, at block 1306, detecting, by the calibration sensor, a returned electromagnetic energy beam reflected by the build platform. The method 1300 includes, at block 1308, calculating a distance between the extrusion system and the build platform based on the returned electromagnetic energy beam. The method 1300 further includes, at block 1310, obtaining a start position for the extrusion system by moving, based on the calculate distance, the extrusion system such that a tip of the extrusion system is in contact with the build platform. In some embodiments, positioning the extrusion system over the build platform comprises positioning the extrusion system over a fiducial marker of the build platform.

Figure 14:
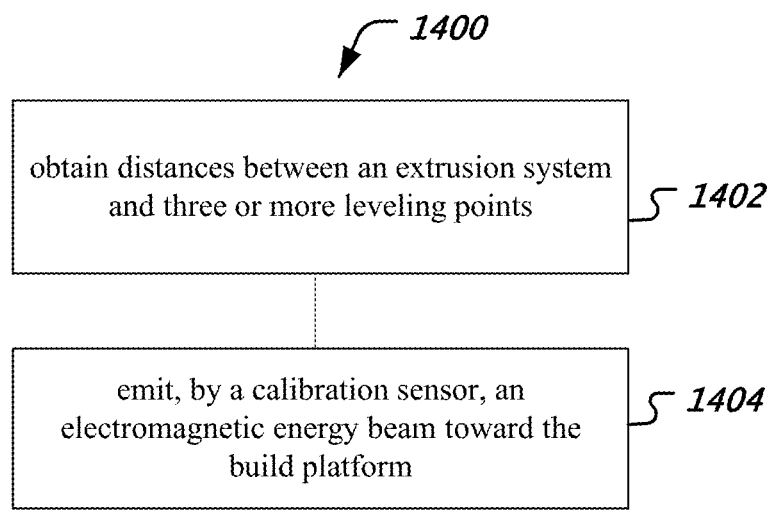
FIG. 14 is a flowchart representation of a method for leveling a 3D printer in accordance with an exemplary embodiment.

FIG. 14 is a flowchart representation of a method 1400 for leveling a portable 3D printer. The method 1400 includes, at block 1402, obtaining distances between an extrusion system and three or more leveling points of the 3D printer. The obtaining each of the distances includes positioning the extrusion system over a leveling point of the three or more leveling points, emitting, by a calibration sensor carried in the extrusion system, an electromagnetic energy beam toward the leveling point, and detecting, by the calibration sensor, a returned electromagnetic energy beam reflected by the build platform. The method 1400 further includes, at block 1404, adjusting, based on the distances, the build platform by three or more leveling motors corresponding to the three or more leveling points such that the build platform is level. In some embodiments, one of the leveling points is located close to the front of the build platform, and the remaining leveling points are located close to the back of the build platform. In some embodiments, four leveling points are positioned beneath the build platform. Each of the leveling points is located close to a corner of the build platform.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A portable three-dimensional, 3D, printer, comprising:
    a material supply system including a spool or a cartridge to supply printing material to a print engine;
    the print engine including an extrusion system that comprises a heating block, the heating block including:
        a top portion coupled to the material supply system to receive the printing material,
        a heating body positioned below the top portion, wherein the heating body is coupled to a heating element operable to supply heat to the heating body and heat up the printing material, the heating body further coupled to a temperature sensor operable to sense a temperature of the heating body, and
        a heat break portion positioned between the top portion and the heating body, the heat break portion having a first end in contact with the top portion, a second end in contact with the heating body, and a center, wherein each end has a larger cross-sectional area than a cross-sectional area of the center to reduce heat transfer from the heating body to other components of the 3D printer;

a movement system that comprises:
an extruder carriage positioned to carry the extrusion system,
multiple pulleys, each positioned to rotate around a vertical axis, wherein at least two of the multiple pulleys are stacked on top of one another to allow a compact design of the movement system, and
one or more belts in contact with each of the multiple pulleys and with the extruder carriage to allow a horizontal movement of the extruder carriage;

a build platform positioned below the movement system to receive the printing material from the extrusion system; and a printer body that encloses the extrusion system, the movement system, and the build platform, wherein the printer body includes an aperture to allow access to an internal space of the 3D printer, wherein the extrusion system includes a calibration sensor positioned to obtain a distance between the extrusion system and the build platform and is configured to detect a rotational movement of the extrusion system in relation to the build plate.

2. The portable 3D printer of claim 1, where extrusion system comprises a printing head positioned to facilitate extrusion of the printing material onto the build platform, the print head having a cross-sectional area that further reduces heat transfer from the heating block to the build platform.

3. The portable 3D printer of claim 2, wherein the cross-sectional area of the printing head is 30%-40% of a heated area of the heating block.

4. The portable 3D printer of claim 1, wherein the extrusion system comprises a removable printing head coupled to the heating body, the removable printing head positioned to receive the heated printing material from the heating body and direct the printing material to the build platform.

5. A portable three-dimensional, 3D, printer of claim 1, comprising:
a material supply system including a spool or a cartridge to supply printing material to a print engine;
the print engine including an extrusion system that comprises a heating block, the heating block including:
a top portion coupled to the material supply system to receive the printing material,
a heating body positioned below the top portion, wherein the heating body is coupled to a heating element operable to supply heat to the heating body and heat up the printing material, the heating body further coupled to a temperature sensor operable to sense a temperature of the heating body, and
a heat break portion positioned between the top portion and the heating body, the heat break portion having a first end in contact with the top portion, a second end in contact with the heating body, and a center, wherein each end has a larger cross-sectional area than a cross-sectional area of the center to reduce heat transfer from the heating body to other components of the 3D printer;

a movement system that comprises:
an extruder carriage positioned to carry the extrusion system,
multiple pulleys, each positioned to rotate around a vertical axis, wherein at least two of the multiple pulleys are stacked on top of one another to allow a compact design of the movement system, and
one or more belts in contact with each of the multiple pulleys and with the extruder carriage to allow a horizontal movement of the extruder carriage;

a build platform positioned below the movement system to receive the printing material from the extrusion system; and a printer body that encloses the extrusion system, the movement system, and the build platform, wherein the printer body includes an aperture to allow access to an internal space of the 3D printer, wherein the movement system includes only ten pulleys, and wherein a first pulley and a second pulley are stacked on top of each other, and a third pulley and a fourth pulley are stacked on top of each other.

6. The portable 3D printer of claim 1, wherein the movement system includes:
a first pulley and a second pulley stacked on top of each other and movable within the internal space of the 3D printer;
a third pulley and a fourth pulley stacked on top of each other and movable within the internal space of the 3D printer;
a fifth pulley and a sixth pulley placed side-by-side in a first corner within the internal space of the 3D printer, the fifth and the sixth pulleys positioned with respect to each other with either an offset in an X-direction in a horizontal plane or an offset in a Y-direction in the horizontal plane but not having an offset in both X- and Y-directions; and
a seventh pulley and an eighth pulley placed side-by-side in a second corner within the internal space of the 3D printer, the seventh and the eighth pulleys positioned with respect to each other with either an offset in the X-direction in the horizontal plane or an offset in the Y-direction in the horizontal plane but not having an offset in both X- and Y-directions.

7. The portable 3D printer of claim 1, wherein the build platform includes:
a build plate including one or more holes positioned in proximity to a center of the build plate,
a platform base located beneath the build plate, and
one or more coupling means that pass though the one or more holes of the build plate to secure the build plate to the platform base.

8. The portable 3D printer of claim 7, wherein the build plate comprises:
a bottom layer including a heating element operable to heat up the build plate,
a middle layer positioned on the bottom layer to provide structural support for the build plate, and
a top layer configured to provide a smooth printing surface.

9. The portable 3D printer of claim 7, wherein the build platform further comprises:
a leveling adapter positioned under the build plate, the leveling adapter including multiple leveling points located in proximity to corners of the leveling adapter; and
multiple leveling knobs coupled to the multiple leveling points of the leveling adapter to allow the build plate to be leveled through the leveling adapter.

10. The portable 3D printer of claim 1, wherein the calibration sensor includes a contact sensor or an infrared sensor.

11. The portable 3D printer of claim 1, wherein the build platform further comprises:
a fiducial marker on the build plate configured to enable the calibration sensor to obtain the distance, and
three or more leveling motors positioned under and coupled to the build plate, each of the leveling motors configured to receive a signal from the calibration sensor and to adjust the build plate according to the signal.

12. The portable 3D printer of claim 1, wherein the material supply system comprises:
a removable spool of the printing material, and
a cover positioned to secure the removable spool to the 3D printer.

13. The portable 3D printer of claim 1, further comprising:
a ventilation system positioned at a side of the printer body to ventilate printing exhaust from the extrusion system, the ventilation system including a plurality of fans wherein two of the plurality of fans are positioned symmetrically with respect to a center line of the portable 3D printer to improve stability, and a removable filter assembly configured to accommodate a filter for filtering the printing exhaust from the plurality of fans.

14. The portable 3D printer of claim 1, wherein a total volume of space occupied by the portable 3D printer is approximately 1000 cubic inches, and a usable area of the build platform for printing 3D objects is approximately 5 inches by 5 inches.

15. A portable three-dimensional, 3D, printer, comprising:
a material supply system including a spool or a cartridge to supply printing material to a print engine;
the print engine including an extrusion system positioned to receive the printing material from the material supply system;
a movement system that comprises:
one or more belts,
multiple pulleys in contact with the one or more belts, each pulley positioned to rotate around a vertical axis, wherein at least two of the multiple pulleys are stacked on top of one another to allow a compact design of the movement system; and
an extruder carriage in contact with the one or more belts, wherein the extruder carriage is positioned to carry the extrusion system and comprises an upper portion in contact with the one or more belts to allow a horizontal movement of the extruder carriage and a lower portion coupled to the extrusion system, the upper portion including a first wall generally parallel to the one or more belts, a second wall generally parallel to the first wall, a center portion located between the first wall and the second wall and spaced apart from the first wall and the second wall, and one or more coupling means that can adjustably pass through at least a section of the extruder carriage to make contact with a section of the one or more belts and to allow a tension adjustment of the one or more belts;
a build platform positioned below the movement system to receive the printing material from the extrusion system; and
a printer body positioned to enclose the extrusion system, the movement system, and the build platform, wherein the printer body includes a movable door to allow access to the build platform.

16. The portable 3D printer of claim 15, wherein the one or more coupling means are configured to pass through the first wall and the center portion before making contact with the one or more belts and pressing the one or more belts against the second wall.

17. The portable 3D printer of claim 15, wherein the first wall includes four openings configured to allow the coupling means to pass therethrough.

18. The portable 3D printer of claim 15, wherein the extrusion system comprises a heating block, the heating block including:
a top portion coupled to the material supply system to receive the printing material,
a heating body positioned below the top portion, wherein the heating body is coupled to a heating element configured to heat up the printing material and to a temperature sensor configured to sense a temperature of the heating body, and
a heat break portion positioned between the top portion and the heating body, the heat break portion in contact with the top portion and with the heating body, wherein the heat break portion has different cross-sectional areas along a longitudinal direction with larger cross-sectional areas at two ends of the heat break portion that contact the top portion and the heating body relative to a smaller cross-sectional area at a center of the heat break portion along the longitudinal direction.

19. The portable 3D printer of claim 18, wherein the extrusion system comprises a removable printing head that is removably coupled to the heating body, the removable printing head positioned to receive the heated printing material from the heating body and to direct the printing material to the build platform.

20. The portable 3D printer of claim 15, wherein the build platform includes:
a build plate including:
a bottom layer including a heating element configure to supply heat to the build plate,
a middle layer positioned on the bottom layer to provide structural support for the build plate,
a top layer configured to provide a smooth printing surface; and
one or more holes positioned in proximity to a center of the build plate,
a platform base located beneath the build plate, and
one or more coupling means that pass though the one or more holes in proximity to the center of the build plate to secure the build plate to the platform base, wherein one or more edges of the middle layer are spaced apart from a boundary of a frame that surrounds the build plate to prevent warping of the middle layer upon an expansion of the middle layer due to application of heat.

21. The portable 3D printer of claim 20, wherein the middle layer includes an aluminum layer, and the top layer includes polyetherimide.

22. The portable 3D printer of claim 15, wherein the extrusion system includes a calibration sensor positioned to obtain a distance between the extrusion system and the build platform, the calibration sensor including an infrared sensor configured to detect an infrared light and produce electrical signals in response thereto,
the calibration system further including a processor and a memory including processor executable code, the processor executable code, when executed by the processor configures the processor to calculate a distance between the extrusion system and the build platform based at least on the electrical signals produced by the infrared sensor.

23. The portable 3D printer of claim 15, wherein the material supply system comprises:
   a removable spool of the printing material, and
   a cover positioned to secure the removable spool to the 3D printer, wherein the removable spool is accommodated in an opening within an internal space of the portable 3D printer such that upon insertion of the removable spool into the opening and placement of the cover, an external surface of the cover is flush with surrounding surfaces of an exterior of the portable 3D printer.

24. The portable 3D printer of claim 15, further comprising:
   a ventilation system positioned at a side of the printer body to remote printing exhaust from an internal space of the portable 3D printer to an outside environment, the ventilation system including two fans positioned symmetrically around a center line of the portable 3D printer, and separated from at least some components in the internal space of the portable 3D printer by a plate disposed at across the internal space of the 3D printer, the ventilation system further including a removable filter assembly facing the outside environment and configured to accommodate a High Efficiency Particulate Air (HEPA) filter.

25. The portable 3D printer of claim 15, wherein a total volume of space occupied by the portable 3D printer is approximately 1000 cubic inches, and a usable area of the build platform for printing 3D objects is approximately 5 inches by 5 inches.

26. The portable 3D printer of claim 15, comprising a single base plate, wherein all components of the movement system are attachable to the single base plate.

27. The portable 3D printer of claim 26, wherein all components of the movement system are formed as sub-assemblies and are attached to the base plate by six or fewer attachment means.

28. The portable 3D printer of claim 27, wherein all components of the movement system are attached to the base plate by only four fastening means.

29. The portable 3D printer of claim 5, wherein the extrusion system comprises a removable printing head coupled to the heating body, the removable printing head positioned to receive the heated printing material from the heating body and direct the printing material to the build platform.

30. The portable 3D printer of claim 5, further including a ventilation system positioned at a side of the printer body to ventilate printing exhaust from the extrusion system, the ventilation system including a plurality of fans, wherein two of the plurality of fans are positioned symmetrically with respect to a center line of the portable 3D printer to improve stability, and a removable filter assembly configured to accommodate a filter for filtering the printing exhaust from the plurality of fans.

* * * * *